United States Patent
Yaish et al.

(10) Patent No.: US 11,125,904 B2
(45) Date of Patent: Sep. 21, 2021

(54) LARGE SCALE GAS ELECTRON MULTIPLIER WITH SEALABLE OPENING

(71) Applicant: Lingacom Ltd., Tel Aviv (IL)

(72) Inventors: David Yaish, Tel Aviv (IL); Yosef Kolkovich, Tel Aviv (IL); Amnon Harel, Haifa (IL); Adam Yona Elbaz, Tel Aviv (IL)

(73) Assignee: Lingacom Ltd., Tel Aviv (IL)

( * ) Notice: Subject to any disclaimer, the term of this patent is extended or adjusted under 35 U.S.C. 154(b) by 270 days.

(21) Appl. No.: 16/247,126

(22) Filed: Jan. 14, 2019

(65) Prior Publication Data

US 2019/0146117 A1     May 16, 2019

Related U.S. Application Data

(63) Continuation-in-part of application No. 14/966,084, filed on Dec. 11, 2015, now Pat. No. 10,191,180.

(60) Provisional application No. 62/091,090, filed on Dec. 12, 2014, provisional application No. 62/091,021, filed on Dec. 12, 2014.

(51) Int. Cl.
| | |
|---|---|
| *G01V 5/00* | (2006.01) |
| *H01J 49/02* | (2006.01) |
| *G01V 13/00* | (2006.01) |
| *G01T 1/26* | (2006.01) |
| *H01J 49/04* | (2006.01) |
| *G01T 1/29* | (2006.01) |
| *H01J 47/02* | (2006.01) |

(52) U.S. Cl.
CPC .............. *G01V 5/0075* (2013.01); *G01T 1/26* (2013.01); *G01T 1/2935* (2013.01); *G01V 5/0016* (2013.01); *G01V 13/00* (2013.01); *H01J 47/02* (2013.01); *H01J 49/025* (2013.01); *H01J 49/0422* (2013.01)

(58) Field of Classification Search
CPC ................................. G01V 5/0008; G01T 1/26
USPC ......................................................... 250/374
See application file for complete search history.

(56) References Cited

U.S. PATENT DOCUMENTS

| | | |
|---|---|---|
| 3,777,221 A | 12/1973 | Tatusko et al. |
| 4,685,210 A | 8/1987 | King et al. |
| | (Continued) | |

OTHER PUBLICATIONS

M. Alexeev et al., "Development of THGEM-based photon detectors for Cherenkov Imaging Counters", JINST—1st International Conference on Micro Pattern Gaseous Detectors, Jun. 2009, IOP Publishing for SISSA.

(Continued)

*Primary Examiner* — David P Porta
*Assistant Examiner* — Abra S Fein
(74) *Attorney, Agent, or Firm* — Intrinsic Law Corp.

(57) ABSTRACT

A detector assembly includes a hollow body in which a printed circuit board, a resistive plate, a drilled board, a drift volume, and a cathode are disposed. A surface of the printed circuit board exposed to the resistive plate includes printed circuit lines for measuring first and second coordinates of a charge event. The hollow body can include a sealable opening to remove contaminants outgassed from one or more components of the detector assembly and to fill the hollow body with an operational gas. The sealable opening can be fluidly coupled to a gas and vacuum system to reduce the concentration of the outgassed contaminants.

45 Claims, 20 Drawing Sheets

(56) References Cited

U.S. PATENT DOCUMENTS

| | | | | |
|---|---|---|---|---|
| 5,463,226 | A | * 10/1995 | Matsuzaki | G01R 23/04 250/336.1 |
| 5,543,663 | A | 8/1996 | Takubo | |
| 7,130,434 | B1 | 10/2006 | Grattan et al. | |
| 7,633,062 | B2 | 12/2009 | Morris et al. | |
| 7,945,105 | B1 | 5/2011 | Jaenisch | |
| 8,288,721 | B2 | 10/2012 | Morris et al. | |
| 8,847,386 | B2 | 9/2014 | Van Veen et al. | |
| 9,182,501 | B2 * | 11/2015 | de Oliveira | G01T 1/2935 |
| 2001/0040937 | A1 | 11/2001 | Francke et al. | |
| 2003/0020702 | A1 | 1/2003 | Matsuyama | |
| 2009/0183760 | A1 | 7/2009 | Meyer | |
| 2009/0322649 | A1 | 12/2009 | Hamer et al. | |
| 2010/0025800 | A1 | 2/2010 | Kim | |
| 2011/0133095 | A1 | 6/2011 | Imai | |
| 2015/0108349 | A1 | 4/2015 | Bendahan et al. | |
| 2015/0323492 | A1 | 11/2015 | Mizutani et al. | |

OTHER PUBLICATIONS

A. Ochi et al., "Micro Pixel Chamber with resistive electrodes for spark reduction", Oct. 22, 2013.

G. Wang et al., "Bayesian Image Reconstruction for Improving Detection Performance of Muon Tomography", IEEE Transactions on Image Processing, May 2009, p. 1080-1089, vol. 18, No. 5, IEEE.

C. L. Morris et al., "Horizontal cosmic ray muon radiography for imaging nuclear threats", Nuclear Instruments and Methods in Physics Research, 2014, p. 42-46, B330, Elsevier.

K. N. Borozdin, "Radiographic imaging with cosmic-ray muons", Nature, Mar. 20, 2003, p. 277, vol. 422, Nature Publishing Group.

A. Clarkson et al., "GEANT4 Simulation of a Scintillating-Fibre Tracker for the Cosmic-ray Muon Tomography of Legacy Nuclear Waste Containers", Sep. 2013, p. 1-11.

J. Armitage et al., "First Images from the Cript Muon Tomography System", Applications of Nuclear Techniques, International Journal of Modern Physics: Conference Series, Feb. 2014, vol. 27, World Scientific.

F. Sauli, "Gas Electron Multiplier (GEM) Detectors: Principles of Operation and Applications", Comprehensive Biomedical Physics, Dec. 2014, vol. 6.

W. B. Gilboy et al., "Industrial radiography with cosmic-ray muons: A progress report", Nuclear Instruments and Methods in Physics Research, May 2007, p. 785-787, No. 580, Elsevier B.V.

S. Riggi et al., "Muon tomography imaging algorithms for nuclear threat detection inside large volume containers with the Muon Portal detector", Nuclear Instruments and Methods in Physics Research, Jul. 2, 2013.

K. Gnanvo et al., "Imaging of high-Z material for nuclear contraband detection with a minimal prototype of a Muon Tomography station based on GEM detectors", Nuclear Instruments and Methods in Physics Research Section A: Accelerators, Spectrometers, Detectors and Associated Equipment, Oct. 2011.

H. M. Jaenisch et al, "Real Time Muon Tomography Imaging Simulation and Fast Threat Target Identification", Proc. of SPIE, 2009, vol. 7310, SPIE.

K. Gnanvo et al., "Large Size GEM for Super Bigbite Spectrometer (SBS) Polarimeter for Hall A 12 GeV program at JLab", Nuclear Instruments and Methods in Physics Research Section A: Accelerators, Spectrometers, Detectors and Associated Equipment, May 11, 2015.

C. L. Morris et al., "Tomographic Imaging with Cosmic Ray Muons", Science and Global Security, 2008, p. 37-53, No. 16, Taylor & Francis Group LLC.

K. Gnanvo et al., "Detection and Imaging of High-Z Materials with a Muon Tomography Station Using GEM Detectors", 2010.

C. L. Morris et al., "Obtaining material identification with cosmic ray radiography", AIP Advances, 2012, AIP Publishing.

M. S. Mitra et al., "Empirical expressions for angular deviation of muons transmitted through slabs of iron, lead and uranium", Nuclear Instruments and Methods in Physics Research A, 2009, p. 684-693, No. 604, Elsevier B.V.

M. Benettoni et al., "Noise reduction in muon tomography for detecting high density objects", Dec. 2013.

R. Oliveira et al., "First Tests of Thick GEMs with Electrodes Made of a Resistive Kapton", Jan. 11, 2007.

S. Pesente et al., "First results on material identification and imaging with a large-volume muon tomography prototype", Nuclear Instruments and Methods in Physics Research A, 2009, p. 738-746, No. 604, Elsevier B.V.

"The New Detector Concept: Properties of Solid Neutron Converters; The Challenge with Insufficient Detection Efficiency; The GEM, a Substrate Transparent to Charges; CASCADE: the Efficient High-Rates Area-Detector for Neutrons", Universitat Heidelberg, www.physi.uni-heidelberg.de/Forschung/ANP/Cascade/Konzept/?lang=en. Date of publication not specified and not found.

G. Wang et al., "Statistical Image Reconstruction for Muon Tomography Using a Gaussian Scale Mixture Model", IEEE Transactions on Nuclear Science, Aug. 2009, p. 2480-2486, vol. 56, No. 4, IEEE.

M. Byszewski et al., "Resistive-strips micromegas detectors with two-dimensional readout", 2nd International Conference on Micro Pattern Gaseous Detectors, Aug. 29-Sep. 1, 2011, IOP Publishing for SISSA.

G. Bencivenni et al., "The Resistive-Well detector: a compact spark-protected single amplification-stage MPGD", 2014.

A. Di Mauro et al., "Development of innovative micropattern gaseous detectors with resistive electrodes and first results of their applications", 2007.

A. G. Agocs et al., "Study of GEM-like detectors with resistive electrodes for RICH applications", 2007.

R. C. Hoch, "Advances in Cosmic Ray Muon Tomography Reconstruction Algorithms", 2009, Florida Institute of Technology.

D G.Underwood et al., "RPC Investigation Using Finely Spaced 2-D Strip Readout", IEEE Nuclear Science Symposium Conference Record, 2007, p. 618-622, IEEE.

L. J. Schultz, "Cosmic Ray Muon Radiography", 2003, Portland State University.

S. J. Stanley et al., "See inside: The development of a cosmic ray muon imaging system to aid the clean up of the Uk's nuclear waste legacy", Annals of Nuclear Energy, 2008, p. 507-517, No. 35, Elsevier.

L. J. J Schultz et al., "Statistical Reconstruction for Cosmic Ray Muon Tomography", IEEE Transactions on Image Processing, Aug. 2007, p. 1985-1993, vol. 16, No. 8, IEEE.

C. Cantini et al., "Long-term operation of a double phase LAr LEM Time Projection Chamber with a simplified anode and extraction-grid design", 2013.

L. Yuanyuan et al., "Imaging Algorithms for Cosmic Ray Muon Radiography Detection of Nuclear Materials", Tsinghua Science and Technology, Jun. 2009, p. 313-321, vol. 14, No. 3.

M. Gola et al., "Performance of the triple GEM detector built using commercially manufactured GEM foils in India", Jun. 14, 2018, pp. 1-15, Department of Physics & Astrophysics, University of Delhi, Delhi, India.

P. Kumpiranon et al., "The current status of the Gas Electron Multiplier (GEM) research at Kasetsart University, Thailand", IOP Conf. Series: Journal of Physics: Conf. Series 860, 2017, pp. 1-9, IOP Publishing.

A. Liyanage et al., "Development of GEM Detectors at Hampton University", Proceedings of Science, Feb. 28, 2018, pp. 1-7.

V. Patel et al., "Review on different methods for reducing outgassing rate from vacuum materials", International Journal of Advance Engineering and Research Development, Apr. 2017, pp. 1-5, vol. 4, Issue 4.

F. Sauli, "The gas electron multiplier (GEM): Operating principles and applications", Nuclear Instruments and Methods in Physics Research A, Aug. 7, 2015, pp. 1-24, vol. 805, Elsevier.

A. Sharma, "Properties of some gas mixtures used in tracking detectors", GSI-Darmstadt, Germany, 2017, pp. 1-19.

(56) References Cited

OTHER PUBLICATIONS

S. Swain et al., "Characteristics of 4GEM detector with Am241 at different gas flow rates", Institute of Physics, Bhubaneswar Bose Institute, Kolkata, Feb. 15, 2017, pp. 1-20.

* cited by examiner

LARGE SCALE GAS ELECTRON MULTIPLIER WITH SEALABLE OPENING

CROSS REFERENCE TO RELATED APPLICATIONS

This application is a continuation-in-part of U.S. patent application Ser. No. 14/966,084, titled "Large Scale Gas Electron Multiplier and Detection Method," filed on Dec. 11, 2015, which claims priority to (a) U.S. Provisional Application No. 62/091,021, titled "Large Scale Gas Electron Multiplier and Detection Method," filed on Dec. 12, 2014, and to (b) U.S. Provisional Application No. 62/091,090, titled "Method and Apparatus for High Atomic Number Substance Detection," filed on Dec. 12, 2014, which are incorporated herein by reference.

TECHNICAL FIELD

This application is directed to detectors and methods of detection. More particularly, to detectors, methods of making the same, and methods of using the same in the context of detecting particle interactions with a gas in said detectors. Yet more particularly, the disclosure relates to large scale ionized gas based detectors which can be used in industrial, security, and other applications.

BACKGROUND

Particle detection is a useful tool in many fields of art. In some instances, one or more particles are detected because of an effect they cause when passing through a medium, such as a gas medium. In some applications, a gas is ionized by interactions with a passing or detected particle. The ionization of a detector gas can be amplified with electromagnetic fields and a detector current or signal can be sensed corresponding to the detection of the passing interacting particle. While the present embodiments and examples can be used for detecting muon particles, those skilled in the art will appreciate that the present designs and principles can also be applied to particle (e.g., neutrons, X-Rays, etc.) detection beyond just muon detection. For example, by adding a "neutron conversion" layer of $^6$Li or $^{10}$B just before the detector detailed here.

A THGEM (Thick Gas Electron Multiplier) detector is a robust, simple to manufacture, high-gain gaseous-electron-multiplier detector. Its operation is based on gas multiplication within small, sub-millimeter to one millimeter, diameter holes, in a double-face Cu-clad printed circuit board (PCB). The Cu on each side of the PCB serves as an electrode. The holes are usually made into the PCB, and we refer to this component as a drilled board (DB). An electric potential is applied between the electrodes and creates a strong dipole electric field within the holes, projecting into the adjacent volumes. This shape of the field is responsible for an efficient focusing of ionization electrons into the holes and their multiplication by a gas avalanche process.

In operation, charged particles pass through the gas and ionize it as Minimum Ionizing Particles (MIP). The electrons that result from ionizations in the gas gap above the THGEM drift towards the THGEM holes. The strong dipole electric field established in the holes by the potential difference between the two THGEM faces pulls the electrons into the holes, where they are multiplied in the strong electric field (e.g., 1-5 MV/m) creating an electron avalanche. An extraction field in the gap below the THGEM is responsible for the charge collection onto a readout anode/pad.

Typical gas mixture in gas-electron multiplying detectors such as THGEMs contain a primary (45-97% of the mixture by weight) noble gas such as Ar, Ne, or He, and quencher gases, which are more complex molecules such as $CO_2$, $CH_4$, and longer-chain hydrocarbons such as ethane, propane, isobutane, isooctane and n-pentane that can absorb some of the electron energies and prevent run-away electron showers. Examples of mixtures are Ar and $CO_2$ (90%, 10%, respectively (by weight)) or Ne and $CF_4$ (95%, 5%%, respectively (by weight)). Other quencher gases in use are $N_2$, dimethyl ether, ethanol, ethyl formate, and hexafluoroethane. However the final selection of the gas mixture depends on the characteristics of the particles, and the application requirements.

In case of cosmic ray muon detection, the actual detector gain and its dynamic range are important. The energy deposited by cosmic ray muons in the gas, which is amplified in the DB, is distributed in a Landau distribution. This means that most of the pulses have a low amplitude and require a high gain to achieve high detection efficiency. However, there are sporadic large pulses due to the high-energy tail of the distribution that can trigger discharge at high gain of the detector. High dynamic range can be achieved by using Ne- or He-based mixtures, as they offer higher dynamic range than Ar-based mixtures. Ar based mixtures can be used when low gas volumes are needed, as they generates 3× more electron primaries than Ne-based mixtures. However, it is more difficult to avoid discharges (in a THGEM configuration) when using Ar-based mixtures.

Imaging requires that the 2D location of the multiplied charge is read out. This is done by reading each coordinate separately, which requires about three times more charge than readout using a pad, and hence better amplification. When the charge is collected directly by the readouts in THGEM, the typical solution is to place thick conductive strips on a PCB, and on them, place thinner strips, each comprising of a conductor and below it an insulator, so that both layers of conductors face the gas. Standard industrial PCB manufacturing techniques may not be able to produce such complex structures. Another solution uses the Resistive Well configuration described below and a two-sided readout PCB, with one side reading the x-coordinates and the other reading the y-coordinate. In this solution, neither layer of readout conductors faces the gas, nor are the signals purely inductive.

When the gas volume below the circuit board and above the readout is omitted, together with the cathode that faced this gas volume, the resulting configuration is known as a well, or a "THWELL." Though the well configuration gives up on the (small) amplification that happens just below the holes in a THGEM, it has the potential to provide stronger signals as the entire avalanche reaches the readout board below. It also simplifies the mechanical structure of the detector and results in a thinner detector. However, since the discharge is cleared through the readouts (and thus, the readout electronics), detectors built in this configuration are likely to be damaged by sparks and, thus, are unreliable.

A variation of THGEM known as Resistive Well includes a resistive layer and an insulating layer below the resistive layer, so the readout is purely inductive. The relevant resistivity for Resistive Well is surface resistivity as the charges collected from the gas are removed to the sides. The Resistive Well configuration can reduce sparking, though the induced charges are somewhat smaller and less focused than the avalanche charges produced in the gas.

Another variation of THGEM known as Resistive Plate Well introduces a resistive plate between the holes and the readout. The relevant resistivity is volume resistivity as the charges collected from the gas are removed through the readout. The Resistive Pate Well configuration can reduce sparking. To ensure good electrical contact between the plate and the readout, the plates are coated with conductive paint and glued to the readouts using conductive epoxy. Using conductive glue is incompatible with detailed readout structures, as needed for 2D readout.

Limitations of a THGEM detector include limited gain and stability due to discharges, centimeter-scale boards (e.g., 5 cm) which complicate the mechanical design when trying to develop a large meter-scale detector, and large numbers of holes (e.g., pitches between holes of less than 1 mm and/or hole sizes of about 0.4 mm) which makes the THGEM less cost efficient for larger scale detectors. Manufacturing flaws can occur at the holes due to sharp edges in the copper and the PCB caused by the drilling of the holes, despite attempts to blunt this by etching and other methods to create rims. Hence the yield decreases with the increase in the number of holes, and the price of a working THGEM increases greater than the increase in the number of holes per THGEM. Even if sparking is eliminated, in a Resistive Well or Resistive Plate Well configuration, manufacturing flaws, such as sharp edges, may ionize gas atoms leading to gas avalanches and streamer discharges, which can degrade detection of the signal from the detected particles.

For a large scale muon detector of several square meters, these dimensions and characteristics are not optimized. The small actual size of each THGEM electrode complicates the mechanical design of a large scale detector, influences the gas distribution, and thus distorts the consistency of the measurements. The small holes and the tiny rim affects the stability and gain by generating discharges which limit the electric potential applied between the THGEM electrodes. The relatively thin THGEM board increases the probability of discharges as well as affecting the robustness of the layer—especially for large-scale detectors. The relatively small pitch between the holes makes the THGEM less cost efficient for larger scale detectors.

The pitch between holes is a key element in the cost of the THGEM which heavily relies on the number of holes. For example, a large THGEM electrode of one square meter with 1 mm pitch between the holes has a million holes, which makes the THGEM less cost efficient for larger-scale detectors.

The electron avalanches induce and accelerate chemical interactions in the gas. Some quencher gases, especially long-chain hydrocarbons, degrade due to these interactions. Impurities present in the gas, whether originally, due to leaks, or due to outgassing from the various detector components, can undergo various chemical interactions resulting in byproducts that degrade the detector's performance and may turn it inoperative. Some particularly problematic byproducts are soot and water vapor.

Therefore, existing THGEMs are operated in gas flow mode, where their gas is continually refreshed. This increases the costs of a THGEM operated outside a lab by requiring a gas supply system and by the continuous consumption of gas.

High-purity gas mixtures are usually maintained using the same technologies used to achieve high vacuum. Namely, (a) by selecting low-outgassing materials for all components, (b) avoiding internal leaks, for example, by using drilled screws, and (c) using an accelerated outgassing procedure using high temperatures and vacuum over several hours or even several days. To achieve very high vacuum, the outgassing is typically performed in temperatures of 950° C.-1100° C. For high vacuum, the outgassing is performed in temperature of 220-350 degrees Celsius. Various mechanical and chemical cleaning techniques are sometimes performed on the surfaces exposed to the gas before the outgassing. Furthermore, any epoxy-based PCBs introduced into such a volume are often pre-baked at 120° C.-240° C. to ensure that the epoxy is fully cured.

It would be desirable to have a detector that overcomes the foregoing limitations.

SUMMARY

Example embodiments described herein have innovative features, no single one of which is indispensable or solely responsible for their desirable attributes. The following description and drawings set forth certain illustrative implementations of the disclosure in detail, which are indicative of several exemplary ways in which the various principles of the disclosure may be carried out. The illustrative examples, however, are not exhaustive of the many possible embodiments of the disclosure. Without limiting the scope of the claims, some of the advantageous features will now be summarized. Other objects, advantages and novel features of the disclosure will be set forth in the following detailed description of the disclosure when considered in conjunction with the drawings, which are intended to illustrate, not limit, the invention.

In an aspect, the invention is directed to a detector assembly. The assembly includes an insulating substrate having a planar surface. The assembly also includes a printed circuit board (PCB) mounted on the planar surface of the insulating substrate, the PCB having opposing first and second surfaces, the first surface exposed to the insulating substrate, the second surface including printed circuit lines. The assembly also includes a resistive plate disposed on and in direct physical contact with the second face of the PCB. The assembly also includes a drilled board disposed on the resistive plate. The assembly also includes a cathode disposed above the drilled board, the cathode defining a drift volume between the cathode and the drilled board, the drilled board disposed between the drift volume and the resistive plate. The assembly also includes a mechanical assembly connected to the insulating substrate and the resistive plate, wherein the mechanical assembly applies a force between the insulating substrate and the resistive plate to form an electrical contact between the printed circuit lines on the PCB and the resistive plate.

In another aspect, the invention is direct to a detector module. The detector module includes a hollow body configured to retain a gas. The detector module also includes a plurality of modular detector assemblies disposed in the body. Each module detector assembly includes an insulating substrate having a planar surface. Each module detector assembly also includes a printed circuit board (PCB) mounted on the planar surface of the insulating substrate, the PCB having opposing first and second surfaces, the first surface exposed to the insulating substrate, the second face including printed circuit lines. Each module detector assembly also includes a resistive plate disposed on and in direct physical contact with the second face of the PCB. Each module detector assembly also includes a drilled board disposed on the resistive plate. Each module detector assembly also includes a cathode disposed above the drilled board, the cathode defining a drift volume between the cathode and the drilled board, the drilled board disposed between the drift volume and the resistive plate. Each module detector assembly also includes a mechanical assembly connected to the plastic stage and the insulating substrate, wherein the mechanical assembly applies a force between the insulating substrate and the resistive plate to form an electrical contact between the printed circuit lines on the PCB and the resistive plate.

In another aspect, the invention is directed to a method of manufacturing a detector assembly. The method includes mounting a printed circuit board (PCB) on a planar surface of an insulating substrate, the PCB having opposing first and second surfaces, the first surface exposed to the insulating substrate, the second face including printed circuit lines. The method also includes placing a resistive plate in direct physical contact with the second face of the PCB. The method also includes disposing a drilled board on the resistive plate. The method also includes disposing a cathode above the drilled board, the cathode defining a drift volume between the cathode and the drilled board, the drilled board disposed between the drift volume and the resistive plate. The method also includes applying a force between the insulating substrate and the resistive plate to form an electrical contact between the printed circuit lines on the PCB and the resistive plate.

In another aspect, the invention is directed to the construction of detector modules and to a process for preparing them for sealed-mode operation, without any gas flow. The detector module includes a hollow body configured to retain a gas and maintain its high purity in elevated temperatures. The detector module also includes an opening used in the preparation process that later be sealed. The detector module also includes one or more modular detector assemblies disposed in the body. Each module detector assembly includes an insulating substrate having a planar surface. Each module detector assembly also includes a printed circuit board (PCB) with printed circuit lines that carry the detector signals. Each module detector assembly also includes a resistive plate disposed in direct physical contact to the PCB. Each module detector assembly also includes a drilled board disposed in direct physical contact with the resistive plate, with an electrode on the face of the drilled board further from the resistive plate. Each module detector assembly also includes a cathode disposed above the drilled board, the cathode defining a gas-filled drift volume between the cathode and the drilled board, the drilled board disposed between the drift volume and the resistive plate. The process of preparing the detector module includes applying low and high vacuum to the detector, and flushing it with high-purity gases, all through the opening. The process of preparing the detector module can also include heating the detector. The process of preparing the detector module can also include sampling the gas within the hollow body.

In another aspect, the invention is directed to the iterative improvement of the design and construction of the detector modules. A method of gas sampling from a working detector is used to analyze the contaminations that develop in the module's gas mixture over long time periods (e.g. months) of operation. These provide feedback on the selection of materials used in the construction of the module, and on the process for preparing them for sealed-mode operation, which is then used to improve these aspects of the production process. The method can also be employed as a quality control method in the field or in a lab to identify detectors that are likely to fail, e.g., within a few months, if redeployed in their current state.

Another aspect of the invention is direct to a detector module comprising: a hollow body having an internal volume that retains a gas; a sealable opening disposed on the hollow body, the sealable opening in fluid communication with the internal volume, wherein when the sealable opening is sealed, the sealable opening provides a vacuum-grade seal having a leak rate less than or equal to $1\times10^{-6}$ cc*atm/second; and a plurality of modular detector assemblies disposed in the hollow body. Each modular detector assembly comprises a printed circuit board (PCB) having opposing first and second surfaces, the first surface exposed to the insulating substrate, the second face including printed circuit lines throughout an active area of each modular detector assembly; a resistive plate disposed on and in direct physical contact with the second face of the PCB; a drilled board disposed on the resistive plate; and a cathode disposed above the drilled board, the cathode defining a drift volume between the cathode and the drilled board, the drilled board disposed between the drift volume and the resistive plate.

In some embodiments, the sealable opening comprises an exit pipe configured to be cold-welded shut. In some embodiments, the sealable opening comprises a seal-off valve. In some embodiments, the sealable opening comprises a vacuum-grade valve. In some embodiments, the hollow body includes: first and second metal portions; and a vacuum-grade seal disposed between the first and second metal portions.

In some embodiments, each modular detector assembly is electrically coupled to a plurality of front-end units (FEUs). In some embodiments, the FEUs are disposed in the hollow body. In some embodiments, the FEUs are disposed outside the hollow body, the FEUs electrically coupled to the modular detector assembly by electrical connectors, and the hollow body comprises glass that is welded shut over the electrical connectors. In some embodiments, the detector module further comprises an external box, the hollow body disposed in the external box.

In some embodiments, the plurality of modular detector assemblies comprises a first modular detector assembly disposed on a first detection plane and a second modular detector assembly disposed on a second detection plane, the first detection plane being different than the second detection plane. In some embodiments, the hollow body is cylindrical.

In some embodiments, the detector module further comprises an external scaffolding, the external scaffolding mechanically attached to an external surface of the hollow body, wherein the hollow body is adapted to attach to the external scaffolding. In some embodiments, the hollow body is adapted to attach to the external scaffolding using screw houses that locally increase a cross-sectional thickness of the hollow body. In some embodiments, the screw houses are disposed on an inner surface of the hollow body.

In some embodiments, the internal volume is greater than or equal to 10 liters and a total active area of the plurality of modular detector assemblies is above 900 cm$^2$.

Yet another aspect of the invention is directed to an assembly comprising: a detector module and a gas and vacuum system. The detector module comprises: a hollow body configured to retain a gas in an internal volume of the hollow body; a sealable opening disposed on the hollow body, the sealable opening in fluid communication with the internal volume, wherein when the sealable opening is sealed the sealable opening provides a vacuum-grade seal having a leak rate less than or equal to $1\times10^{-6}$ cc*atm/second; a plurality of modular detector assemblies disposed in the hollow body. Each modular detector assembly comprises a printed circuit board (PCB) having opposing first and second surfaces, the first surface exposed to the insulating substrate, the second face including printed circuit lines throughout an active area of each module detector assembly; a resistive plate disposed on and in direct physical contact with the second face of the PCB; a drilled board disposed on the resistive plate; and a cathode disposed above the drilled board, the cathode defining a drift volume between the cathode and the drilled board, the drilled board disposed between the drift volume and the resistive plate. The gas and vacuum system is in fluid communication with the sealable opening. The gas and vacuum system comprises at least one vacuum pump; a heat source in thermal communication with the detector module; a gas source in fluid communication with the sealable opening; and at least one valve disposed between (a) the sealable opening and (b) the vacuum pump and the gas source, the at least one valve having a first state where the vacuum pump is connected to the sealable opening and the gas source is disconnected from the sealable opening, and a second state where the gas source is connected to the sealable opening and the vacuum pump is disconnected from the sealable opening.

In some embodiments, the sealable opening comprises an exit pipe configured to be cold-welded shut. In some embodiments, the sealable opening comprises a seal-off valve. In some embodiments, the sealable opening comprises a vacuum-grade valve.

In some embodiments, the assembly further comprises a gas composition sensor in fluid communication with the sealable opening. In some embodiments, the gas composition sensor comprises a mass spectrometer. In some embodiments, the gas and vacuum system includes a second valve disposed between the sealable opening and a sampling chamber, the second valve having an open state that allows a gas sample from the detector module to pass into the sampling chamber through a low-conductance opening, the second valve having a closed state that blocks the low-conductance opening. In some embodiments, the sampling chamber is fluidly coupled to at least a second vacuum pump and a third valve is disposed between the sampling chamber and the at least a second vacuum pump.

In some embodiments, the heat source includes an oven or heating elements, the heating elements disposed beneath the detector module. In some embodiments, the assembly further comprises an external scaffolding, the external scaffolding mechanically attached to an external surface of the hollow body, wherein the hollow body is adapted to attach to the external scaffolding. In some embodiments, the hollow body is adapted to attach to the external scaffolding using screw houses that locally increase a cross-sectional thickness of the hollow body. In some embodiments, the screw houses are disposed on an inner surface of the hollow body.

In some embodiments, the assembly further comprises a commissioning box, the detector module disposed in the commissioning box, and wherein the at least one vacuum pump and the gas source are in fluid communication with the sealable opening via the commissioning box. In some embodiments, the internal volume is greater than or equal to 10 liters and a total active area of the plurality of modular detector assemblies is above 900 cm$^2$.

Another aspect of the invention is directed to a method of preparing the detector module, as described herein, for sealed-mode operation, the method comprising the following steps: (a) fluidly coupling at least one vacuum pump to the sealable opening of the detector module; (b) with the at least one vacuum pump, applying a vacuum pressure to the sealable opening for a predetermined time period to reduce an internal pressure within the detector module to lower than $1\times10^{-3}$ torr; and (c) while applying the vacuum pressure, heating the detector module with a heat source for the predetermined time period.

In some embodiments, the method further comprises: (d) receiving a gas sample from the detector module; and (e) passing the gas sample through a gas composition sensor to determine a measured gas composition of the gas sample. In some embodiments, the method further comprises: (f) comparing a measured concentration level of a contaminant in the gas sample with a maximum acceptable contaminant concentration level; and (g) determining that the detector module is ready for the sealed-mode operation when the measured concentration level of the contaminant in the gas sample is lower than the maximum acceptable contaminant concentration level. In some embodiments, the method further comprises repeating steps (a)-(g) until the measured concentration level of the contaminant in the gas sample is lower than the maximum acceptable contaminant concentration level.

In some embodiments, steps (a)-(c) initially occur for a first predetermined time period, and steps (a)-(c) are repeated for a second predetermined time period, the second time period shorter than the first predetermined time period. In some embodiments, the method further comprises flushing the detector module with a chemically-inactive gas mixture prior to step (d); and after step (g): stopping the at least one vacuum pump; cooling the detector module to ambient temperature; flowing an operational gas mixture into the detector module; and sealing the sealable opening to retain the operational gas mixture in the hollow body.

In some embodiments, the detector module is flushed with the chemically-inactive gas mixture prior to step (a). In some embodiments, the method further comprises flushing the detector module with the operational gas mixture while the detector module is cooling. In some embodiments, the method further comprises flushing the detector module with a first gas while the detector module is cooling; and after the cooling, applying a second vacuum pressure, with the at least one vacuum pump, to the sealable opening to remove the first gas from the detector module. In some embodiments, the method further comprises fluidly coupling the vacuum pump to a commissioning box, the detector module disposed in the commissioning box; and after sealing the sealable opening, removing the detector module from the commissioning box.

In some embodiments, step (c) further comprises heating the detector module to within a temperature range of about 60° C. to about 200° C. In some embodiments, the method further comprises fluidly coupling the at least one vacuum pump to a commissioning box, the detector module disposed in the commissioning box.

Yet another aspect of the invention is directed to a method of collecting information on gas-related failure modes of the detector module, as described herein, wherein the detector module comprises a malfunctioning detector module, the method comprising: (a) fluidly coupling at least one vacuum pump to the sealable opening of the malfunctioning detector module; (b) with the at least one vacuum pump, applying a vacuum pressure to the sealable opening for a predetermined time period to reduce an internal pressure within the malfunctioning detector module to lower than $1\times10^{-3}$ torr; (c) receiving a gas sample from the malfunctioning detector module; (d) passing the gas sample through a gas composition sensor to determine a measured gas composition of the gas sample; and (e) analyzing the measured gas composition to determine a source of the gas-related failure modes.

Yet another aspect of the invention is directed to a method of collecting information on the detector module, as described herein, wherein the sealable opening comprises a re-sealable opening and the detector module comprises an operating detector module, the method comprising: (a) fluidly coupling at least one vacuum pump and a gas collection volume to the re-sealable opening of the operating detector module; (b) with the at least one vacuum pump, applying a vacuum pressure to the re-sealable opening; (c) at least partially opening the re-sealable opening to release a gas sample from the operating detector module to the gas collection volume; (d) passing the gas sample through a gas composition sensor to determine a measured gas composition of the gas sample; and (e) analyzing the measured gas composition to determine concentrations of contaminants in the operating detector module, wherein the method does not compromise further operation of the operating detector module.

In some embodiments, the method further comprises re-tuning a voltage across the cathode and the drilled board to compensate for the loss of gas when the re-sealable opening is at least partially opened in step (c). In some embodiments, the method further comprises determining concentration levels of the contaminants that cause the detectors to fail. In some embodiments, the method further comprises (f) predicting when the operating detector module will fail based on the concentrations of the contaminants; and (g) redeploying the operating detector only when a predicted remaining life of the operating detector is greater than a threshold time period.

IN THE DRAWINGS

For a fuller understanding of the nature and advantages of the present invention, reference is being made to the following detailed description of preferred embodiments and in connection with the accompanying drawings, in which.

Figure 15A:
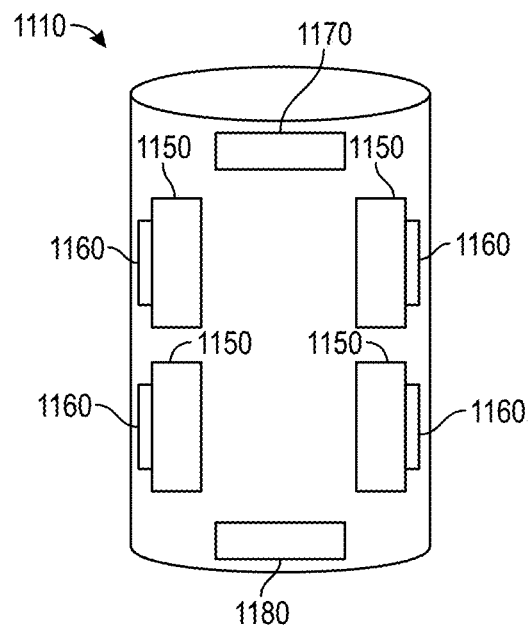
Figure 15B:
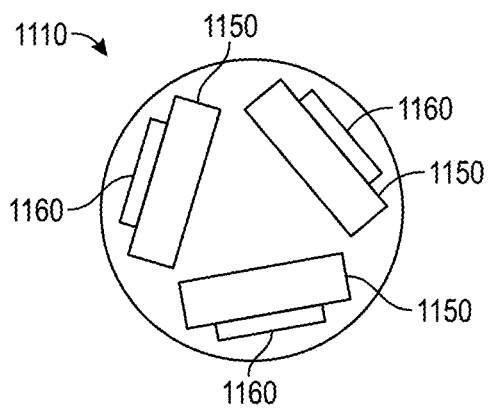
Figure 15C:
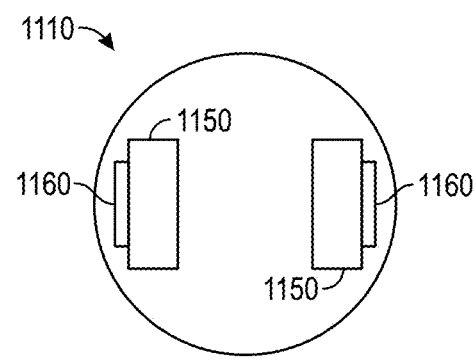
Figure 16A:
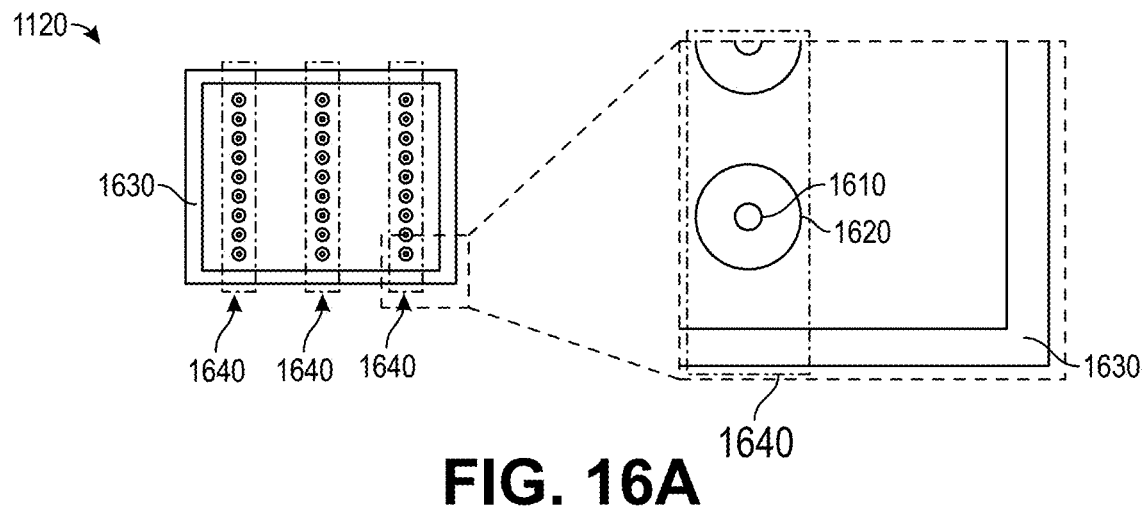
Figure 16B:
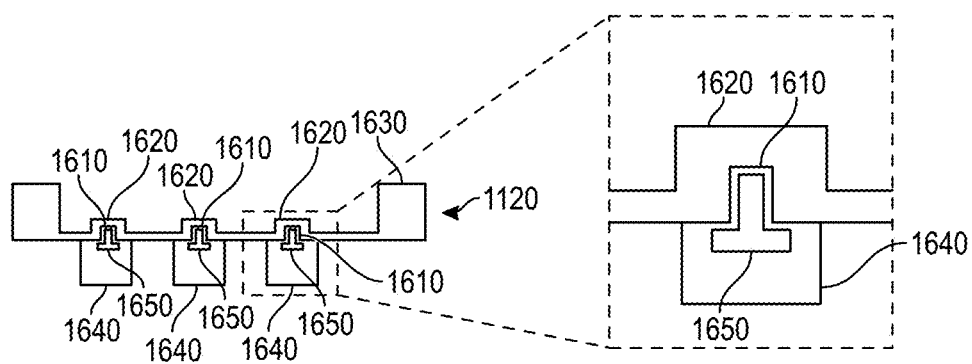
Figure 17A:
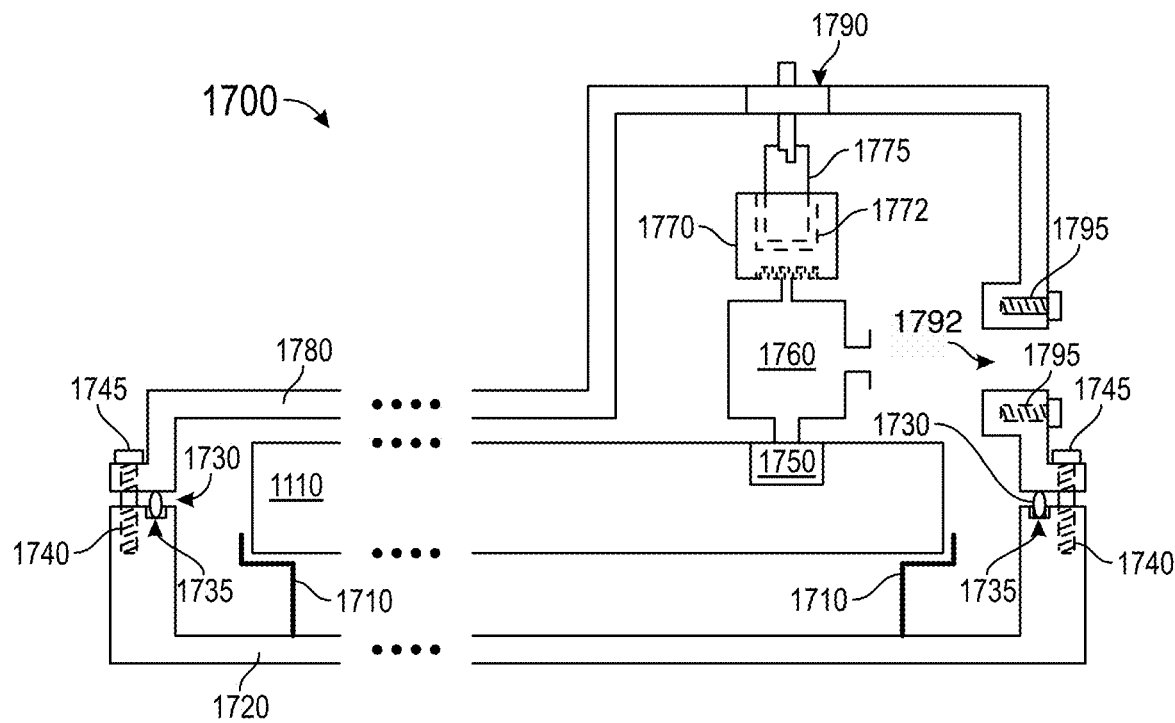
Figure 17B:
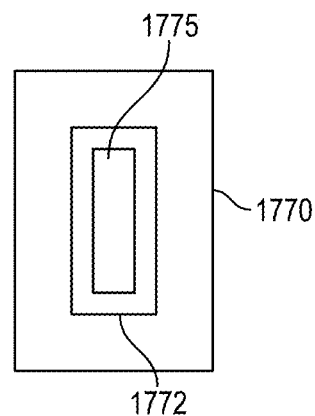

FIGS. 15A, 15B, and 15C illustrate cylindrical detector modules with multiple detection planes according to an embodiment; and FIGS. 16A and 16B illustrate internal and side views of the mechanical structure of a detector module wall that can be attached to external scaffolding according to an embodiment; and FIGS. 17A and 17B illustrate side and top views of a commissioning box according to an embodiment.

DETAILED DESCRIPTION

The present disclosure overcomes some or all of the limitations of the THGEM and its various configurations as discussed above. In an aspect, the disclosure provides a charged particle detector that can operate on a large scale (e.g., 5-25 square meters) for detecting cosmic rays. In particular, this disclosure provides systems and methods for detecting cosmic muons as they enter and exit some volume to be scanned, such as a shipping container or a truck, for dangerous high-Z materials (e.g., radioactive and nuclear materials). The detector can operate at a relatively low flux rate (e.g., about 130 Hz/square meter muons) and can have an adequate spatial resolution (e.g., about 2-5 mm) to detect such high-Z materials. Reference will be made to an exemplary detector called a Well with Imaging and Resistive Plate (WIRP), though the disclosure is not limited to such a detector. The charged particle detector can detect muons, neutrons, and other charged particles.

Figure 1:
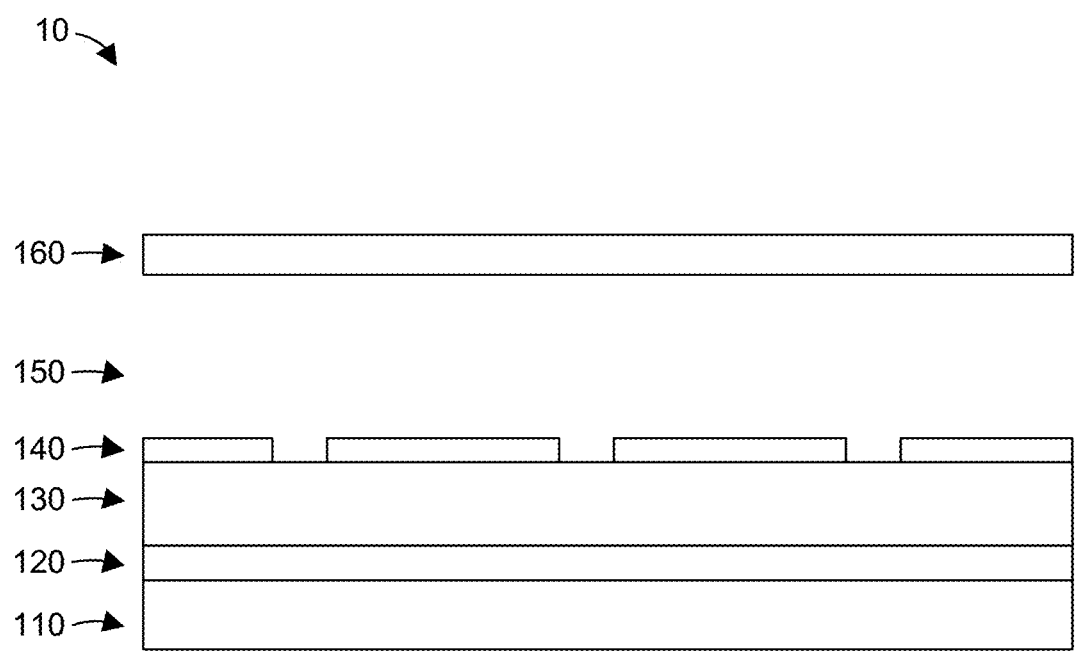
FIG. 1 is a side view of a detector assembly according to an embodiment.

FIG. 1 illustrates a side view of a detector assembly 10 according to an embodiment. The detector 10 includes a plastic stage 110, a printed circuit board (PCB) 120, a resistive plate 130, a drilled board 140, a drift volume 150, and a cathode 160.

The circuit board 120 is disposed on the plastic stage 110. The plastic stage 110 receives an external force (e.g., from screws, bolts, a clamp, a mechanical assembly) to press the circuit board 120 towards the resistive plate 130 (or vice versa). For example, a mechanical assembly can be mechanically coupled or connected to the plastic stage 110 and the resistive plate 130 to press (e.g., using a mechanical force) the plastic stage 110 towards the resistive plate 130 and to press the resistive plate 130 towards the plastic stage 110. In some embodiments, the plate 130 includes holes for receiving screws or bolts that are driven between the plastic stage 110 and the plate 130. The holes can be disposed along a perimeter of the stage 110 and/or on its interior surface. This mechanical force can create electrical contact between the circuit lines on the circuit board 120 and the resistive plate 130. This is an advantage over the prior art approach of adhering a circuit board to a resistive plate with conductive glue/epoxy. The mechanical force can also fix the position and orientation of the circuit board 120 relative to the plastic stage 110 and the resistive plate 130. Thus, the mechanical force can maintain alignment of the readout lines on the circuit board 120 with the resistive plate 130 and the drilled board 140. In addition, the plastic stage 110 can distribute the external mechanical force across the circuit board 120 to prevent bending or cracking of the circuit board 120 or damage to its electrical contacts. In some embodiments, alternative materials can be used to contrast the plastic stage 110. For example, the plastic stage 110 can be formed out of any rigid and insulating material, such as the epoxy substrates used for a printed circuit boards, a ceramic (e.g., alumina, berrylia, etc.) substrate, or similar materials. In some embodiments, the plastic stage 110 is optional (e.g., the detector 10 can not include the plastic stage 110).

Figure 1A:
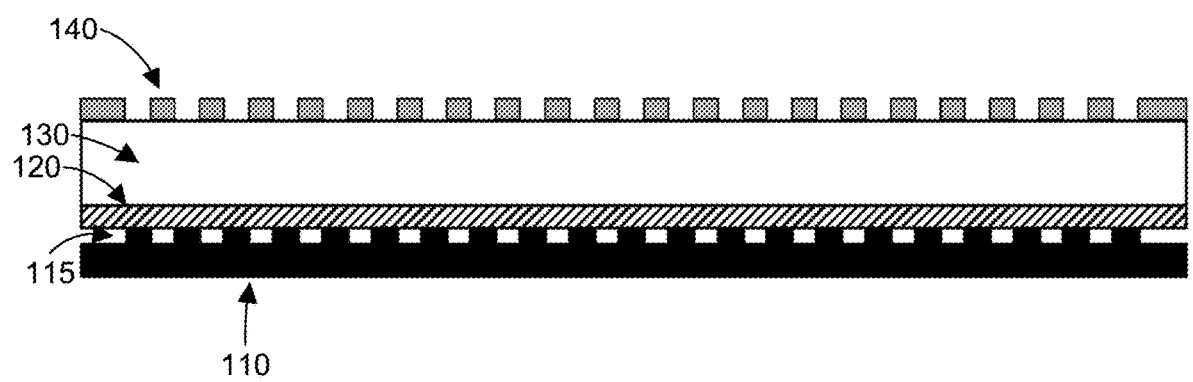
FIG. 1A is a side view of a portion of a detector according to an embodiment.

As illustrated in FIG. 1A, in some embodiments, the plastic stage 110 can have flat bumps 115, which are aligned to concentrate the pressure on the circuit board 120 directly below the holes in the drilled board 140. For example, the bumps can have the same diameter as the holes in the drilled board 140, resulting in a pressure that is over four times larger than the pressure of the equivalent construction without any bumps 115.

Returning to FIG. 1, the printed circuit board 120 is disposed between the plastic stage 110 and the resistive plate 130. The printed readout or circuit lines in the circuit board 120 face the resistive plate 130 (e.g., the active area of detector 10) and thus directly collect the charges produced in the gas for both the x and y coordinates. The PCB 120 can be manufactured using industry standard techniques.

The circuit board 120 includes circuit lines running along a surface of the circuit board 120 that faces the resistive plate 130. The circuit lines include first circuit lines for measuring a first coordinate (e.g., the "x" coordinate) and second circuit lines for measuring a second coordinate (e.g., the "y" coordinate). The first and second circuit lines can have various orientations with respect to each other. For example, the first and second circuit lines can be disposed orthogonally to each other (e.g., along the vertical and horizontal axes), at a 45-degree angle with respect to each other, a 30-degree angle with respect to each other, a 10-degree angle with respect to each other, or any other orientation. For example, some circuit lines can run parallel to the x axis of the circuit board 120 (horizontally in FIG. 1) to measure they coordinate and some circuit lines can run parallel to the y axis (vertically in FIG. 1) to measure the x coordinate. The circuit lines that measure the x and y coordinates can be configured in a comb-like pattern. The circuit lines can be aligned with the holes in the drilled board 140.

Figure 2:
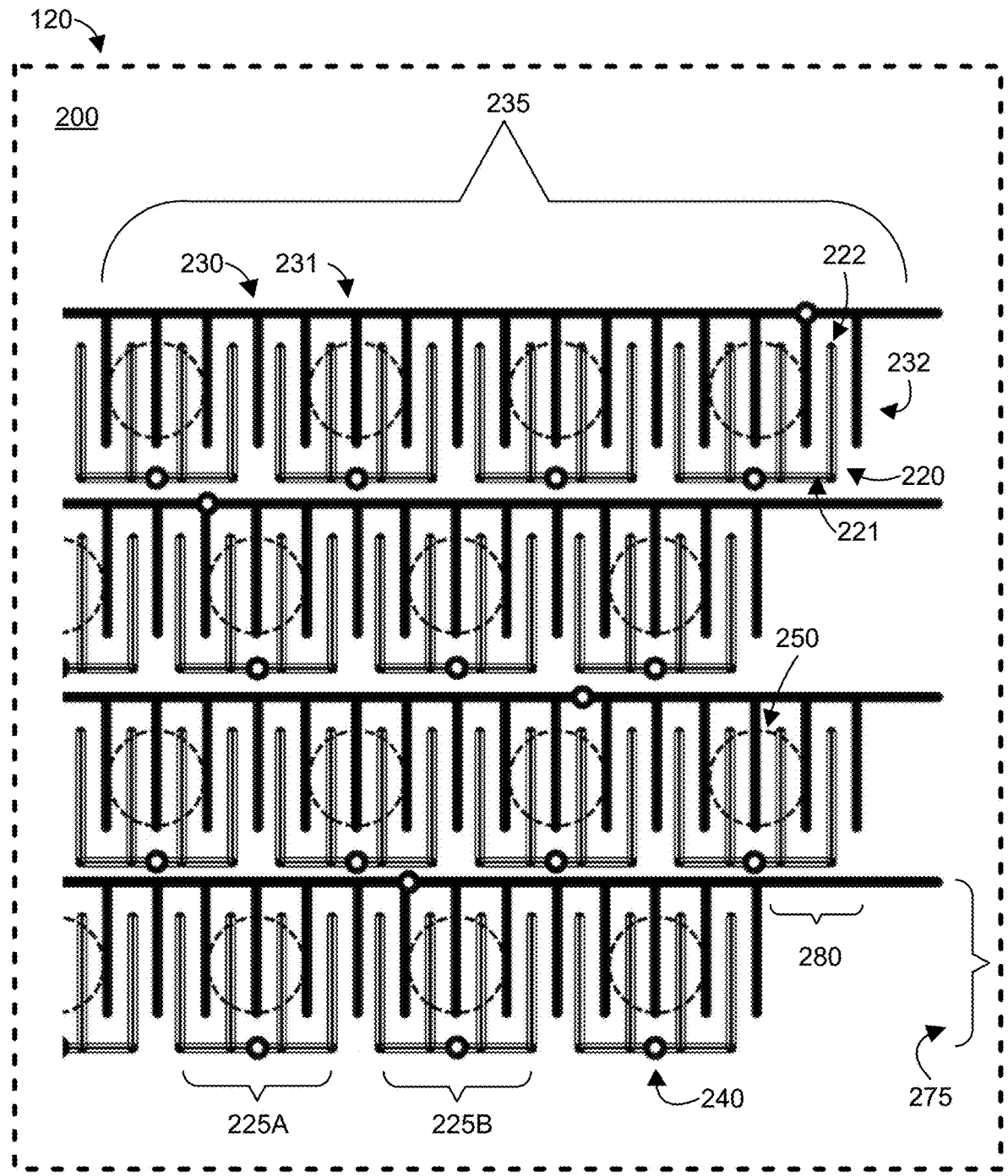
FIG. 2 is a top view of a circuit board from FIG. 1 according to an embodiment.

FIG. 2 illustrates a top view of circuit board 120. The "top" 200 of the circuit board 120 faces the resistive plate 130 while the "bottom" of the circuit board 120 faces the plastic stage 110. An array of circuit lines 220 that measure the x coordinates and an array of circuit lines 230 that measure the y coordinates are disposed on the top 200 of circuit board 120. The circuit lines 220, 230 are generally arranged in a comb-like pattern having intermingling or alternating teeth. The circuit lines 220 that measure the x coordinates include horizontal line portions 221 and teeth 222. The horizontal line portions 221 and teeth 222 are orthogonal to one another. The circuit lines 230 that measure the y coordinates include horizontal lines 231 and teeth 232. The horizontal lines 231 and teeth portions 232 are orthogonal to one another. In some embodiments, the horizontal line portions 221 and teeth 222 are oriented at an angle between 0 and 90 degrees with respect to on another, for example 30 degrees, 45 degrees, 60 degrees, or any angle therebetween. In some embodiments, the horizontal line portions 231 and teeth 232 are oriented at an angle between 0 and 90 degrees with respect to on another, for example 30 degrees, 45 degrees, 60 degrees, or any angle therebetween. Likewise, the combs 225, 235 can be oriented at an angle between 0 and 90 degrees with respect to on another, for example 30 degrees, 45 degrees, 60 degrees, or any angle therebetween As illustrated, the horizontal line portions 221 of circuit lines 220 are discontinuous across a row 275 and thus form discrete combs 225A, 225B, 225n (in general, "x" combs 225). In contrast, the horizontal lines 231 are continuous along a row 275 with teeth 232 disposed along the length of horizontal lines 231 to form a continuous "y" comb 235. Although the horizontal line portions 221 are illustrated as discontinuous and the horizontal lines 231 are illustrated as continuous in FIG. 2, it is noted that the structure can also be reversed. In other words, the circuit lines 220 that measure the x coordinates can have continuous horizontal lines while the circuit lines 230 that measure the y coordinates can have discontinuous line portions. Each comb 225, 235 is connected to a respective readout line on the bottom of the circuit board 120 through respective vias 240.

The combs 225, 235 are aligned with the holes 250 in the drilled board 140, which are projected onto the top 200 of the circuit board in FIG. 2 for illustration purposes. Due to the alignment, two teeth 222 of the "x" comb 225 and one tooth 232 of the "y" comb 235 are disposed below each hole 250 in drilled board 140. In some embodiments, a different number of teeth 222 are disposed below each hole 250. For example, in some embodiments, two "x" teeth 222 and two "y" teeth 232 are disposed below each hole 250. Alternatively, in some embodiments, one "x" tooth 222 and two "y" teeth 232 are disposed below each hole 250. As each tooth 222, 232 can detect an electron avalanche (caused by a muon ionizing gas in the drift volume 150) that occurs near it, and as the width of the avalanches is limited, and as detection in both coordinates is required to locate the avalanche, the efficiency of the detector 10 will be low when the density of the teeth 222, 232 is too low. However, the density of teeth 222, 232 can be limited by manufacturing and/or cost constraints.

In some embodiments, the alignment of the circuit lines 220, 230 with the holes 250 in the drilled board 140 can include horizontal offsets 280 to compensate for the pattern of holes 250, which can be disposed in a hexagonal or nearly-hexagonal grid, such as a honeycomb pattern. In some embodiments, a pin (e.g., a plastic pin) can be inserted through the circuit board 120 to fix its horizontal position so the drilled board 140 can be aligned with the readout lines in the circuit board 120. In some embodiments, the circuit board 120 and the drilled board 140 are mechanically connected, for example, through one or more screws, to further secure their alignment. The mechanical connection also provides electrical contact between the circuit lines 220, 230 in circuit board 120 and the resistive plate 130 beneath each hole 250 without needing a conductive adhesive, as discussed above.

Figure 3:
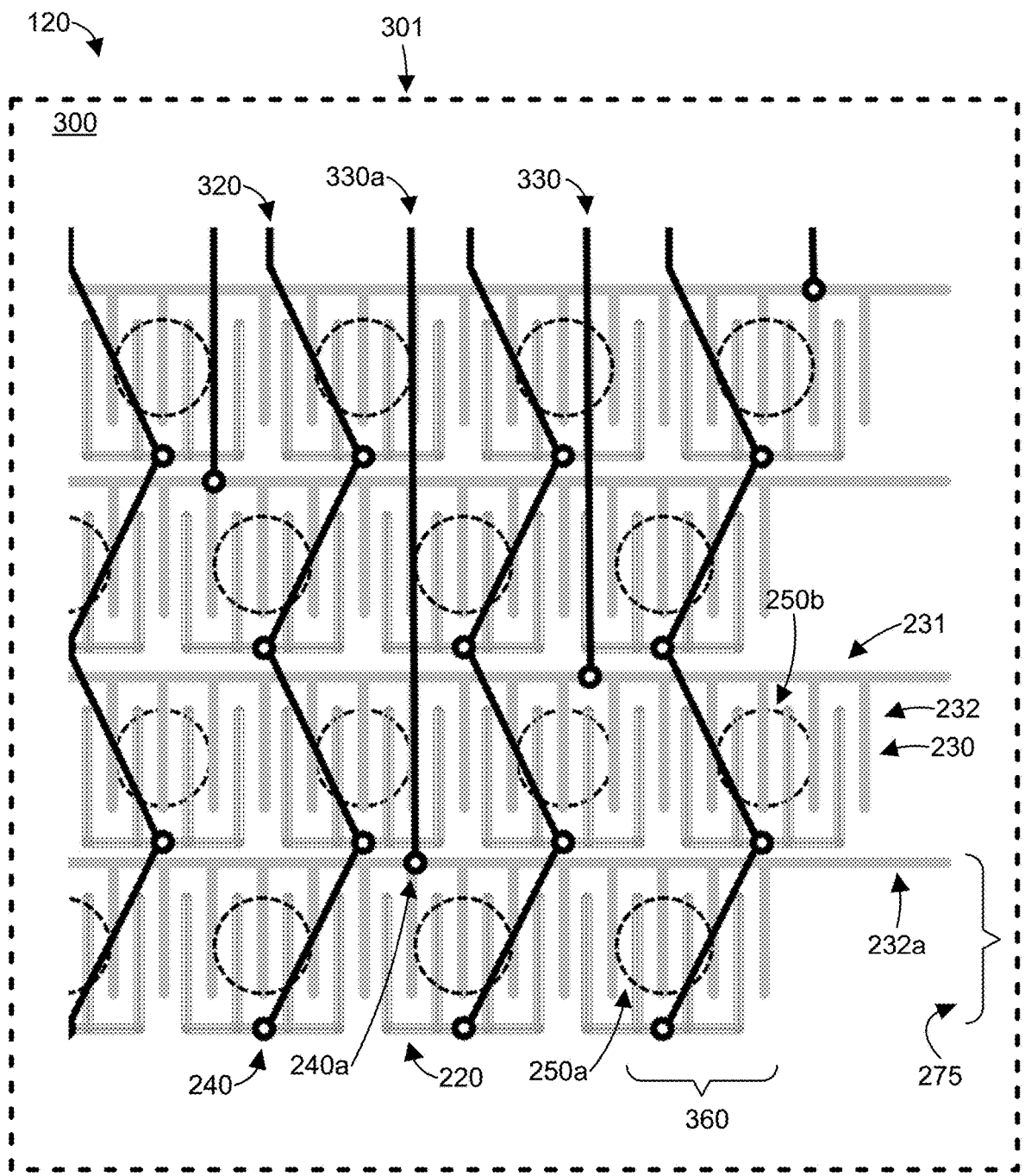
FIG. 3 is a bottom view of a circuit board from FIG. 1 according to an embodiment.

FIG. 3 illustrates a bottom view of circuit board 120. The "bottom" 300 of the circuit board 120 faces the plastic stage 110. A plurality of "x" readout-lines 320 and "y" readout lines 330 are disposed on the bottom 300 of circuit board 120. Although not normally visible from the bottom 300 of the circuit board 120, circuit lines 220, 230 and holes 250 in drilled board 140 are illustrated in FIG. 2 as projections of the respective structures for illustration purposes. The readout lines 320, 330 are connected to respective circuit lines 220, 230 by vias 240, as discussed above. The "x" readout lines 320 form a zig-zag pattern as they extend between vias 240 along a column 360 of holes 250a, 250b. The holes 250a, 250b are offset horizontally (in the "x" direction") because the holes 250 are arranged in a honeycomb pattern. However, the holes 250 can be arranged in other patterns as discussed below. The "y" readout lines 330 extend from a via 240 connected to line 231 which extends across a given row 275 on the top 200 of the circuit board 120. The readout lines 320, 330 can be narrow (e.g. about 0.25 mm) to reduce capacitance. As used herein, "about" means plus or minus 10% of the relevant number or value (e.g., about 10 means between 9-11).

Thus, the readout lines 320, 330 can output a signal that represents the position (i.e., row 275 and column 360) of the electron avalanche created at drilled board 140 due to an ionization in the drift gap 150 by a particle (e.g., a muon). The charge is amplified in a hole 250 and is detected by respective circuit lines 220, 230 on the top 200 of the circuit board 120. Two or more detectors 10 can be used to measure the position of the particle at two locations to reconstruct a segment of the particle's path.

In some embodiments, one or more metal pins extend from the resistive plate 130 to one or both readout lines 320, 330. The pins can contact the resistive plate 130 beneath each hole 250 in the drilled board 140. For example, a first pin can contact the "x" readout line 320 beneath a first hole 250 and a second pin can contact the "y" readout line 330 beneath the first hole 250. Such contact between the readout lines 320, 330 and the resistive plate 130 can improve electrical contact between the resistive plate 130 and the circuit board 120.

The horizontal lines 231 can be read out on the side edge of the top 200 of the circuit board 120. In that embodiment, the readout lines 330 are not needed. As illustrated in FIGS. 2 and 3, however, the horizontal lines 231 are connected through vias 240 to readout lines 330 that extend in a vertical direction (i.e., in the "y" direction orthogonal to the horizontal lines 231) on the bottom of the board 120 and, therefore, the readout lines 330 can be readout at the upper or lower edge of the board 120. The horizontal line portions 221 on the top 200 of the circuit board 120 are connected through vias 240 to readout lines 320 that extend vertically in a zig-zag arrangement on the bottom 300 of the board 120 and, therefore, the readout lines 320 can be readout at the upper or lower edge of the board 120. In some embodiments, the circuit board 120 can only be readout at a single edge, for example, if the readout lines 320 or 330 extend to the upper edge but not to the lower edge of board 120.

Figure 4:
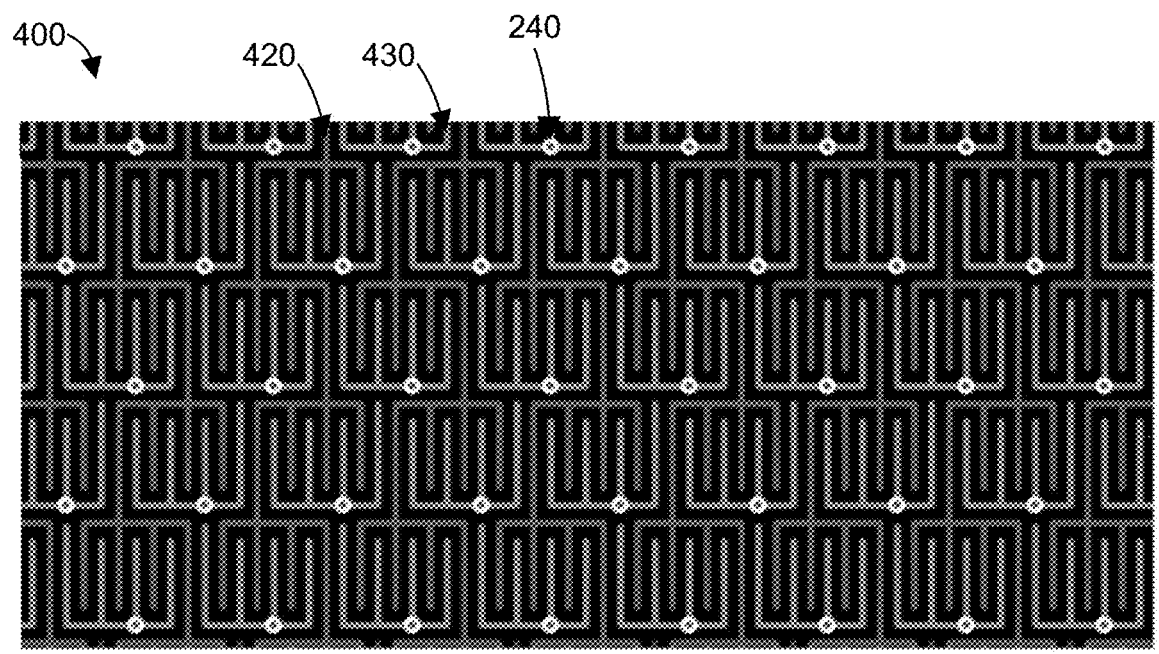
FIG. 4 illustrates an alternative embodiment of a circuit board from FIG. 1.

In another embodiment, illustrated in FIG. 4, all the readout lines can be connected along the left and/or the right edge of the circuit board 120. This is accomplished by introducing additional vias 140 that connect the readout lines running along the front side 400 to orthogonal readout lines running on the backside 300 to the desired edge of the board. In FIG. 4, the dark lines 420 measure the x coordinate and the light lines 430 measure the y coordinate. It is noted that the dark lines 420 and the light lines 430 both include discontinuous horizontal lines in contrast to FIGS. 2 and 3 in which the "x" horizontal lines 221 are discontinuous while the "y" horizontal lines 231 are continuous.

Connecting the readout lines to a single edge of the circuit board 120 allows multiple circuit boards 120 to be modularly arranged next to one another in a large detector configuration. This is an advantage over prior art systems where the "x" coordinate readouts connected on a first edge and the "y" coordinate readouts connected on a second edge of a circuit board, which meant that only 4 of such circuit boards could be arranged next to one another (to provide the two exposed edges for the readouts on each circuit board).

The locations of the vias 240 can be optimized according to the size of the detector. For large detectors, it is desirable to minimize the longest readout path. One way to reduce the readout path is by connecting the horizontal lines 232 that are furthest from the edge of the board 140 where the readout connections are made with vias placed near the center of the respective horizontal lines 232. For example, the horizontal line 232a is connected to via 240a at approximately the midpoint or center of the horizontal line. Thus, the longest readout path would be from the edge of horizontal line 232a (i.e., about half the width of the board 140 along the top 200) through via 240a to readout line 330a, which extends to edge 301 (i.e., about the full length of the board 140 along the bottom 300).

In some embodiments, the size and density of the combs 225, 235 can be limited due to crosstalk and/or interference, that can occur between adjacent horizontal lines 231 or adjacent readout lines 320, 330 if the distance between them is small (e.g., less than 1 mm). To reduce such crosstalk/interference, the spacing between adjacent readout lines 320, 330 can be increased. For example, the readout lines 330 can be arranged in a zigzag pattern to follow the readout lines 320. Alternatively, the vias 240 can be positioned so that the both readout lines 320, 330 form straight lines (or substantially straight lines).

Returning to FIG. 1, the resistive plate 130 is disposed between the printed circuit board 120 and the drilled board 140. The resistive plate 130 can be made from a plastic polymer designed for electrostatic discharge. In some embodiments, the resistive plate 130 is between about 0.4 mm and 4 mm in thickness, for example about 0.4 mm, about 0.6 mm, about 0.8 mm, about 1 mm, about 1.2 mm, about 1.4 mm, about 1.6 mm, about 1.8 mm, about 2 mm, about 2.2 mm, about 2.4 mm, about 2.6 mm, about 2.8 mm, about 3 mm, about 3.2 mm, about 3.4 mm, about 3.6 mm, about 3.8 mm, or about 4 mm in thickness. In other embodiments, the thickness of plate 130 is greater than about 4 mm, which can correspond to the thickness of readily available plates of such materials, such as SEMITRON® ESD 225 (available from Quadrant Plastics Composites Inc.).

The presence of the resistive plate 130 allows the detector to operate with large electric fields (e.g. 5 MV/m) without suffering from sparks. In particular, even cosmic muons that ionize many electrons, leading to larger electron showers, are unlikely to result in a spark. With these large electric fields, the detector can provide robust amplification with large gains (e.g., $10^4$-$10^6$). Large detectors generally require large gains since their readout strips have higher capacitance and thus require larger signal charges.

The drilled board 140 is a printed circuit board with a plurality of holes defined therein. The drilled board 140 can be a single-faced copper-clad printed circuit board having an epoxy substrate (e.g., FR-4). The copper thickness can be chosen according to industry standards, such as 17 microns or 35 microns. In some embodiments, the drilled board 140 is formed of multiple sub-units of identical drilled boards to provide a scalable configuration. For example, the drilled board 140 can be formed of a 4×4 array of modular drilled boards.

Figure 5:
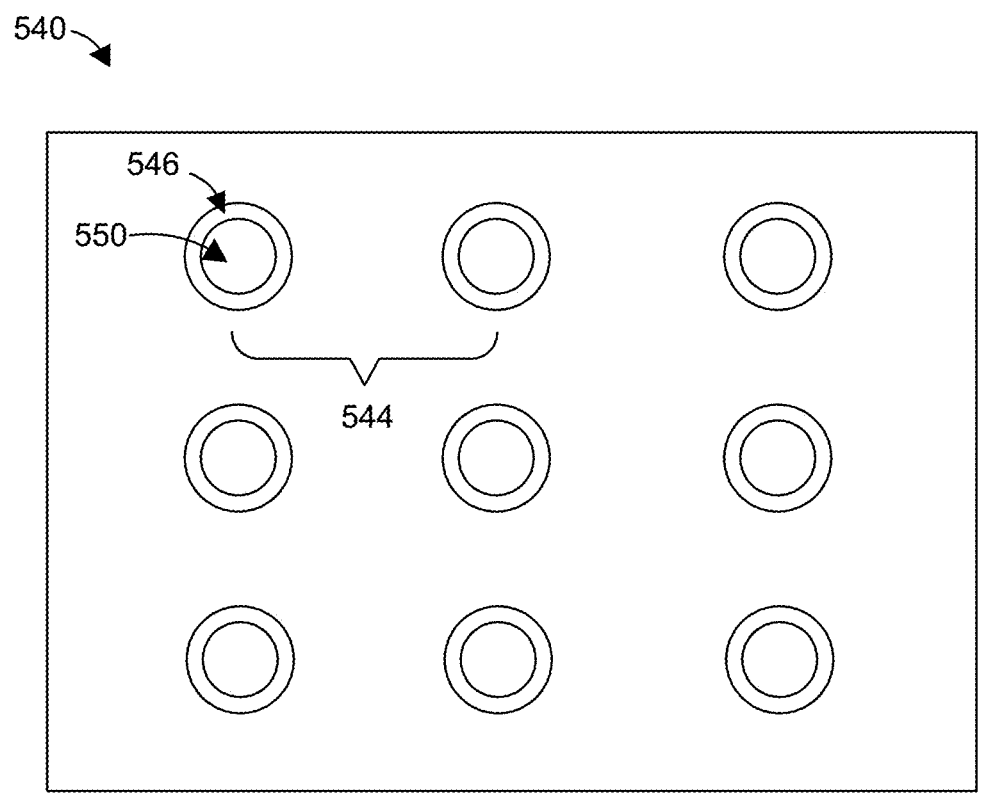
FIG. 5 is a top view of a drilled board according to an embodiment.

FIG. 5 is a top view of a drilled board 540 according to an embodiment. The drilled board 540 includes a plurality of holes 550, as discussed above. The holes 550 can be formed by mechanically drilling the board 540 or through punching. After the holes 550 are formed, they can be chemically etched to dull any sharp edges to reduce streamer discharges.

The holes 550 can have a pitch 544 (i.e., distance between centers of adjacent holes 550) of about 2 mm to about 5 mm, which is 3-5 times higher than the pitch used in prior art systems. This increase in pitch results in a corresponding decrease (by 10-25 times) in the number of holes, which reduces manufacturing cost. The increase in pitch can also improve the detector stability. Since discharge occurs within the holes, reducing the number of holes reduces the probability of discharges and allows operation at higher voltages, thus improving the multiplication gain. In some embodiments, the pitch 544 is about 3 mm or about 4 mm.

If higher spatial resolutions are desired, pitches as small as 0.8 mm can be produced. As notes above, costs can rise rapidly with the number of holes, so small pitches are most useful when the desired detector area is small.

The holes 550 are arranged in a pattern or a grid, as illustrated in FIGS. 2, 3, and 5. In some embodiments, the holes 550 are arranged in a hexagonal, or almost hexagonal pattern, as illustrated in FIGS. 2 and 3. A hexagonal pattern can provide better coverage of the drilled board 540, which can provide enhanced electron collection efficiency. The holes 550 can have a diameter of about 0.4 mm to about 3 mm, such as about 0.4 mm, about 0.6 mm, about 0.8 mm, about 1 mm, about 1.2 mm, about 1.4 mm, about 1.6 mm, about 1.8 mm, about 2 mm, about 2.2 mm, about 2.4 mm, about 2.6 mm, about 2.8 mm, or about 3 mm. Standard drill diameters, such as 1 mm, 1.5 mm, etc. are preferred.

Figure 6:
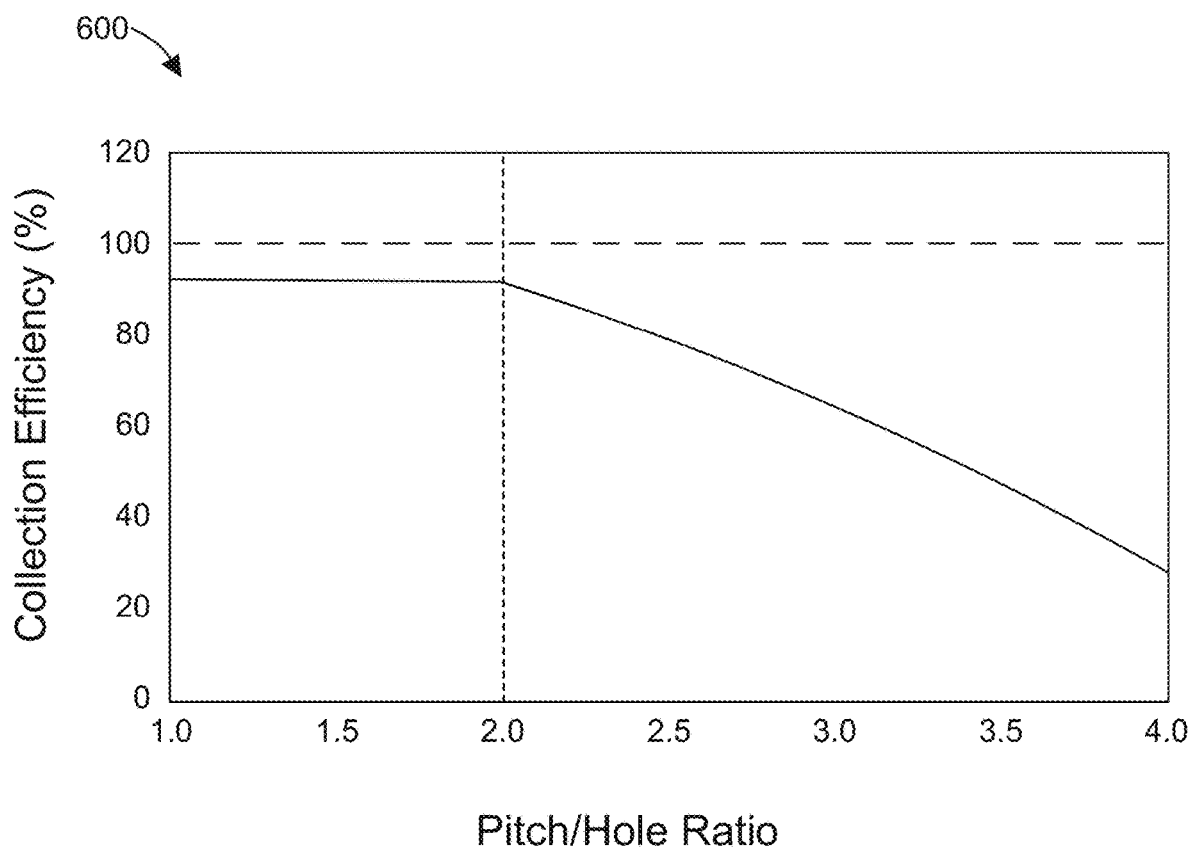
FIG. 6 is a graph formed as a result of a simulation collecting randomly-generated particles using a drilled particle board with holes having various diameters and pitches.

The ratio of the pitch 544 to the diameter of the holes 550 can vary from about 1.4 to about 3 including about 1.6 mm, about 1.8 mm, about 2 mm, about 2.2 mm, about 2.4 mm, about 2.6 mm, and about 2.8 mm. Higher ratios create larger electric fields in the holes and thus stronger amplification; however, they can also lower the electron collection efficiency. FIG. 6 is a graph 600 formed as a result of a simulation collecting randomly-generated particles using the drilled particle board 540 with holes 550 having various diameters and pitches 544. As indicated in the graph 600, the electron collection efficiency is at its maximum value (about 90%) when the pitch/hole ratio is less than or equal to 2.0. In the preferred embodiment, the pitch is twice the hole diameter. For example, the standard drill diameter of 1.5 mm can be matched to a pitch of 3 mm.

Figure 7:
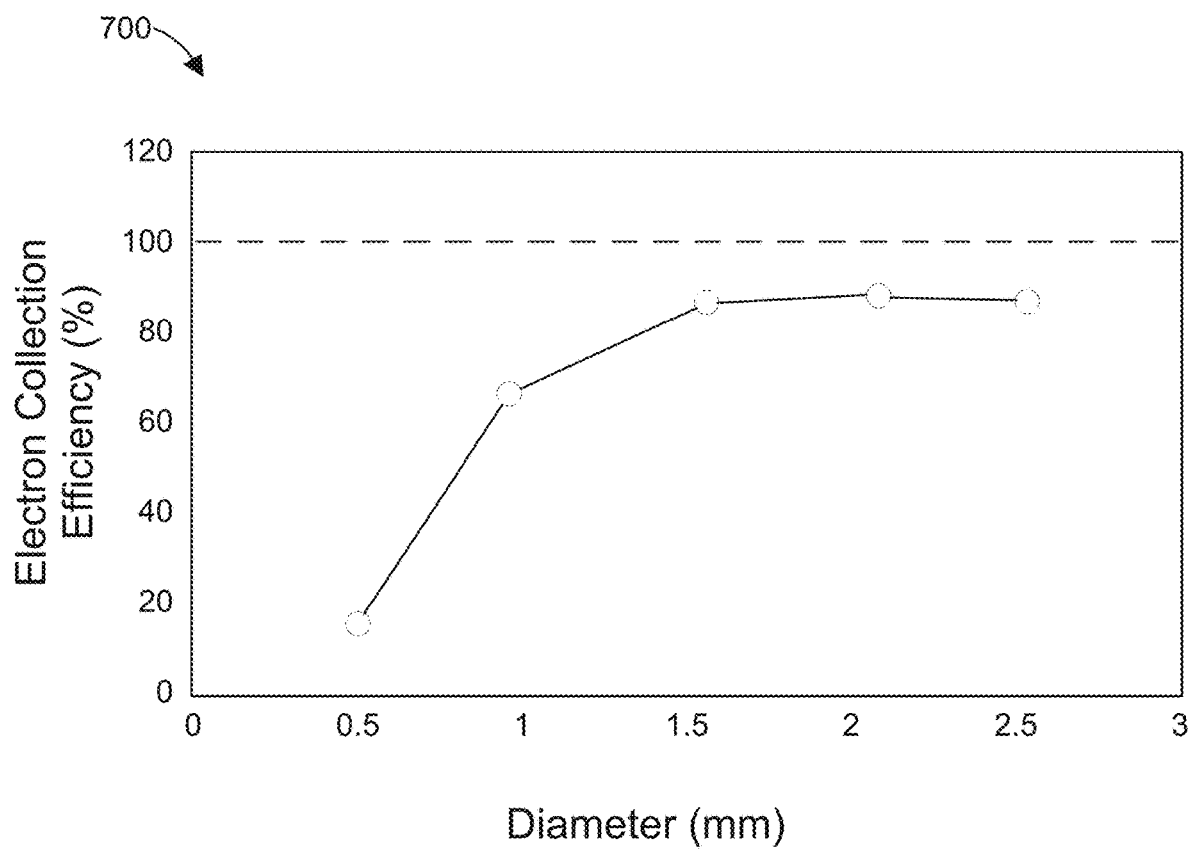
FIG. 7 is a graph of hole diameter in a drilled particle board against electron collection efficiency.

FIG. 7 is a graph 700 based on the same simulation described above. The graph 700 plots the diameter of the holes 550 against the electron collection efficiency. For each diameter, the pitch 544 remained constant at 3.0 mm. As illustrated in the graph 700, the collection efficiency reaches a maximum when the diameter is greater than or equal to 1.5 mm, which corresponds to a pitch/hole ratio of less than or equal to 2.0, as discussed above.

Returning to FIG. 5, a clearance ring 546 is formed at the edge of the hole 550. The ring 546 is a narrow region (e.g., about 100 microns to about 200 microns) surrounding the perimeter of the hole 550 where the metal (e.g., copper) has been removed, for example by chemical etching. The removal of metal can eliminate any sharp edges on the perimeter of the hole 550, which can appear as a result of drilling the holes 550. When an etching process is used, the initial thickness of the copper can be about 140 microns, aiming for about 35 microns after etching. Alternatively, the clearance ring 546 can be formed before the hole 550 is drilled, to avoid creating sharp copper edges during the drilling.

Returning to FIG. 1, the cathode 160 is disposed above the drilled board 140, the space between the cathode 160 and the drilled board 140 defining the drift volume 150. The detector 10 is placed in a sealed volume filled with gas, filling the drift volume 150 and the holes in the drilled board 140. The gas can include Ar, Ne, and/or He. For example, the gas can be 90% Ar and 10% $CO_2$ (by weight), 30% Ar and 70% $CO_2$ (by weight), or 95% Ne and 5% $CF_4$ (by weight). The gas can have a pressure slightly above atmospheric pressure, e.g., 1.005-1.03 bar at sea level. The cathode 160 applies a voltage across the drift volume 150 to the drilled board 140. The voltage is chosen to yield a drift field of 0.1-1 kV/cm, including about 0.2 kV/cm, about 0.3 kV/cm, about 0.4 kV/cm, about 0.5 kV/cm, about 0.6 kV/cm, about 0.7 kV/cm, about 0.8 kV/cm, and about 0.9 kV/cm.

In operation, a charged particle (e.g., muon) passing through the drift volume 150 ionizes the gas therein. The drift field in the drift volume 150 pushes the electrons towards the drilled board 140. The large field in the holes of the drilled board 140 guides the electrons into the holes where they create electron avalanches. The resulting charge flows through the resistive plate 130 and is conducted by the readout PCB 120 toward the readout electronics, which typically reside outside the gas volume.

Figure 8:
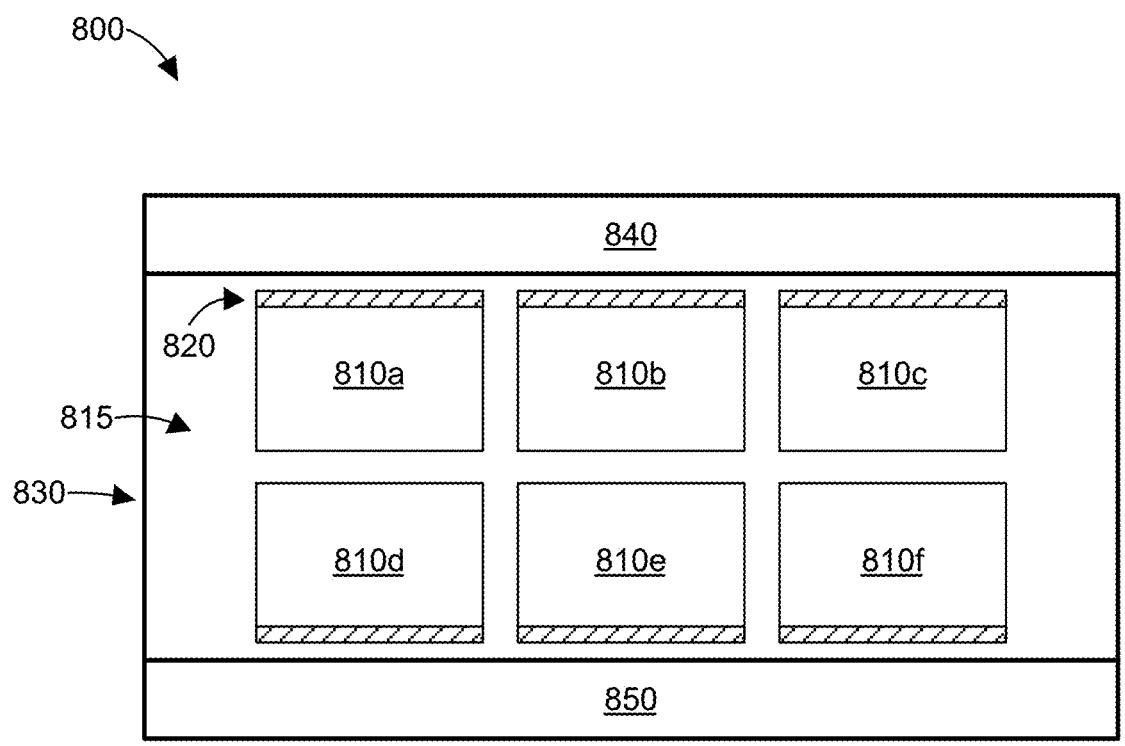
FIG. 8 is a block diagram of a detector module for detecting charged particles according to an embodiment.

FIG. 8 is a block diagram of a detector module 800 for detecting charged particles. The module 800 includes an 3×2 array of detector units 810a, 810b, 810c, 810d, 810e, and 810f (generally detector units 810). The module 800 is scalable as fewer or additional detector units 810 can be included. The detector units 810 are the same or substantially the same as the detector unit 10 described above. Each detector unit 810 is configured to have an analog readout 820 on a single edge of the respective detector unit 810. The readout 820 can be an exposed edge of the circuit board (e.g., circuit board 120) where the readout lines terminate. The analog readouts 820 are connected to electronics boxes 840, 850. The electronics boxes 840, 850 each include a control panel, communications interfaces, front end units (FEUs) which digitize the signals collected through the readouts 820, and one or more processors or field programmable gate arrays (FPGAs). The control panel can include controls for the DC voltage applied to the detector units and for gas flow to the module 800. The communications interfaces can include Ethernet ports, WiFi transceivers, or other communications interfaces to communicate with the detectors 810. The communications interfaces can also include a PC interface to connect to a computer, a server, etc.

The detector units 810 are disposed in a housing that defines a gas volume 815 to retain a gas. The gas can be an Ar-, Ne-, or He-based gas mixtures, for example $ArCO_2$ (e.g., 90% Ar and 10% $CO_2$ (by weight)) or $NeCF_4$ (e.g., 95% Ne and 5% $CF_4$ (by weight)). The housing 830 can be formed out of a metal or it can be lined with a metal. If the housing 830 is lined with metal, the body of the housing can be an insulator. The metal can shield the readout lines 220, 230, 320, 330 on the circuit board from external electric noise, thus less than 1 mm of an excellent conductor such as iron can be used, while poorer conductors such as aluminum require a thickness above 1 mm. If a thin metallic layer (e.g., 1 mm) is used with an insulating housing, the metal can be either internal to the insulating housing, which protects it from the outside environment, and/or it can be external to the insulating housing, which reduces the possible paths for unwanted discharges within the gas volume.

Figure 9:
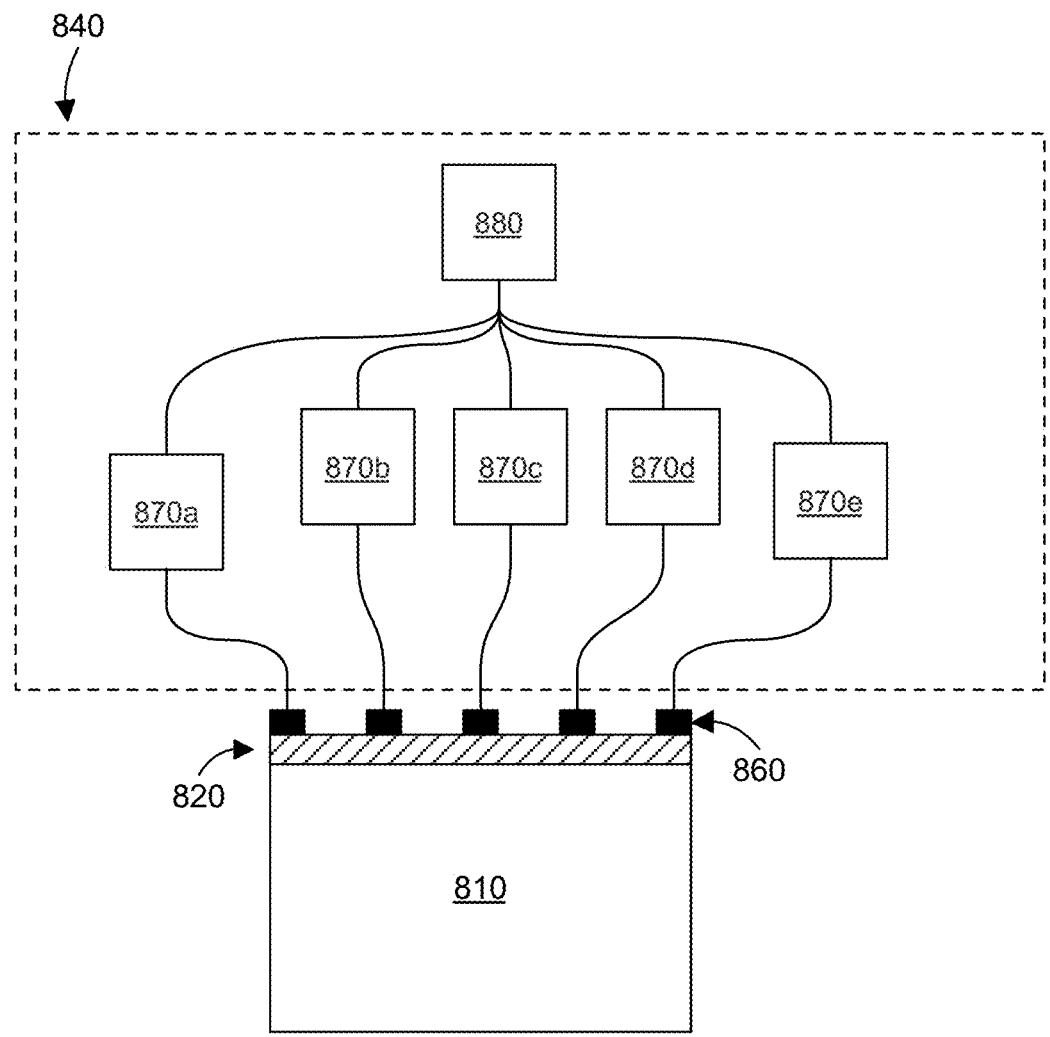
FIG. 9 is a block diagram of a representative portion of the detector module illustrated in FIG. 8.

FIG. 9 is a block diagram of a representative portion of the module 800 illustrated in FIG. 8. The block diagram illustrates a series of connectors 860 in electrical communication with the electronic readout 820. Each connector 860 is assigned a channel (e.g., a range of signals) from the electrical readout 820. Each connector 860 is in electrical communication with a respective FEU 870a-e (in general, FEU 870). The FEUs 870 are each in electrical communication with a processor or FPGA 880 (herein FPGA 880). Although FIG. 9 illustrates only a single detector 810, it is noted that the structure of FIG. 9 can apply to some or all detectors 810 described above with respect to FIG. 8. The FEUs 870 can be placed near, but outside, the gas volume 815, as illustrated in FIG. 9, or they can be placed within the gas volume 815. For example, the FEUs 870 can be located beside the readout PCB (e.g., circuit board 120) and connect to its edge. Alternatively, the FEUs 870 can be integrated into the readout PCB (e.g., circuit board 120) and be similarly located on its periphery.

For each channel, the relevant FEU 870 (a) passes the signal through a protection circuit, which can block any DC current or abnormally-large current spike originating from the detector 810, (b) amplifies the signal, (c) shapes the signal, (d) digitizes the signal in an analog to digital converter, and (e) in parallel to (d), compares the analog signal to a trigger voltage threshold and appropriately raises a trigger for that channel. The trigger voltage threshold can be set to filter most (e.g., at least about 95% such as about 98%, about 99%, or about 99.9%) of the transient noise from the detector 810. In some embodiments, the voltage threshold is set to about 1-2 V.

The FPGA 880 controls data flowing to and from the FEUs 870. For example, the FPGA 880 can send a signal to the FEUs 870 to set one or more parameters of each FEU 870. The parameters can include the trigger voltage threshold for the FEUs 870 as described above, the duration of the signal integration window, which channels may participate in the trigger, etc. When the FPGA 880 receives an output trigger signal from a given FEU 870, the FPGA 880 checks for a local coincidence with respect to the output trigger signal. To do so, the FGPA 880 checks whether the FEU 870 received a signal above the trigger voltage threshold in both the x and y coordinate readouts from the same detector 810 within a predetermined time period (e.g., between about 25 ns and about 200 ns). If the local coincidence check fails (e.g., a signal was received in the x coordinate readout but not the y coordinate readout), the FPGA 880 determines that the output trigger signal occurred due to electronic noise from the detector 810 or module 800. If the local coincidence check passes (i.e., a signal was received in both the x and y coordinate readouts), the FPGA 880 determines that the trigger signal is valid and then sends a signal to all FEUs 870 to report the signals from their respective channels. The FPGA 880 can then send the data reported from the FEUs 870 to a computer or server via a PC interface in the electronics box 840. In addition to the charge/signal data from the FEUs 870, the FPGA 880 can also send monitoring data for the detector such as data from temperature sensors, pressure sensors, voltage sensors, and/or settings of the FEUs 870. In some embodiments, when the FPGA 880 determines that the local coincidence check passes, the FPGA 880 sends a signal to all other FPGAs in a larger system to request that those FPGAs report the data measured by their respective FEUs.

In some embodiments, the FEUs 870 are disposed on the face of the PCB (e.g., PCB 120) of each detector 810 that is exposed to the plastic stage 110. This allows the respective readout lines to be shorter since they connect with the FEUs 870 on the PCB and do not need to extend along the connectors 860 to the electronics box 840.

In some embodiments, the FEUs 870 are placed within the gas volume 815 and are integrated into the readout PCB 120, with their components placed on the backside (i.e. facing away from the resistive plate 130 and drilled board 140) of the PCB 120. Connectors 860 to the FEUs 870 are placed on the PCB 120 so each readout line ("x" or "y") is connected through a connector 860 to an FEU 870. However, the PCB 120 should not be pushed against the resistive plate 130 in the area dedicated to the components of the FEUs 870. For example, the plastic stage 110 can have depressions in its face aligned with the components of the FEUs 870, or the entire FEUs 870, that prevent or minimize contact between the stage 110 and the sensitive parts of the FEUs 870 on the readout PCB 120.

Figure 9A:
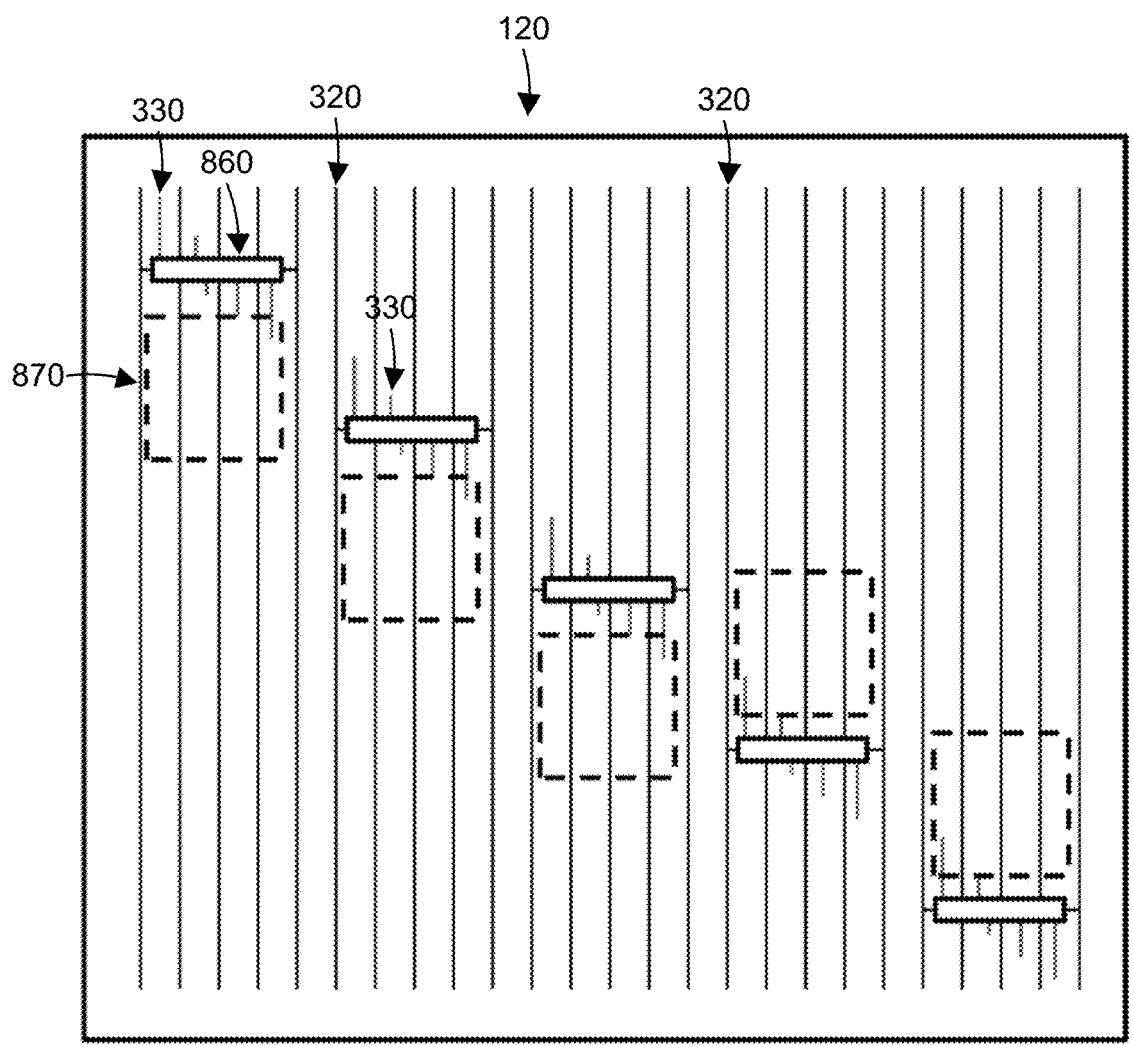
FIG. 9A illustrates a backside of a printed circuit board according to an embodiment.
Figure 9B:
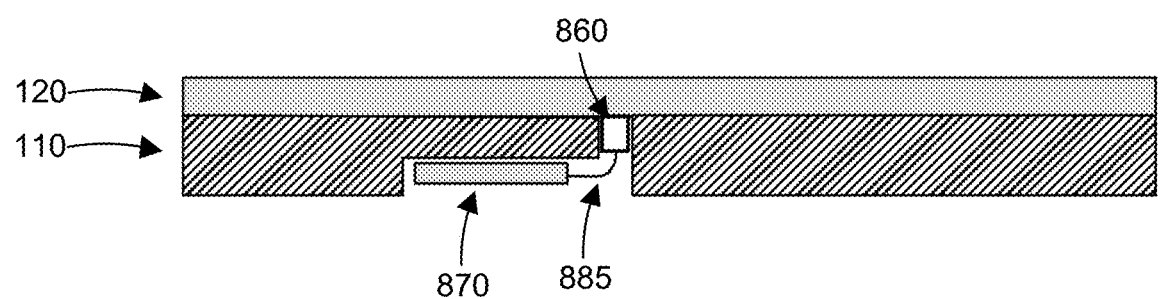
FIG. 9B is a side view of a portion detector assembly according to an embodiment.

Alternatively, the FEUs 870 can be connected directly or through flexible ribbons to the readout lines. Connecting the FEUs 870 to the readout lines 890 directly or through flexible ribbons allows the respective readout lines to be shorter since they do not need to extend along the connectors 860 to the electronics box 840. FIG. 9A illustrates a direct connection of the FEUs 870 to the "x" and "y" readout lines 320, 330, respectively, on PCB 120 using connectors 860. Furthermore, placing the FEUs 870 within the readout PCB 120 allows particularly short readout lines for the coordinate whose lines run on the front of the readout PCB 120 (In FIG. 9A, these are the readout lines 330 for the "y" coordinate readout). As illustrated in FIG. 9B, the connection through flexible ribbons 885 allows for a compact arrangement of the FEUs 870 within the plastic stage 110.

Figure 10:
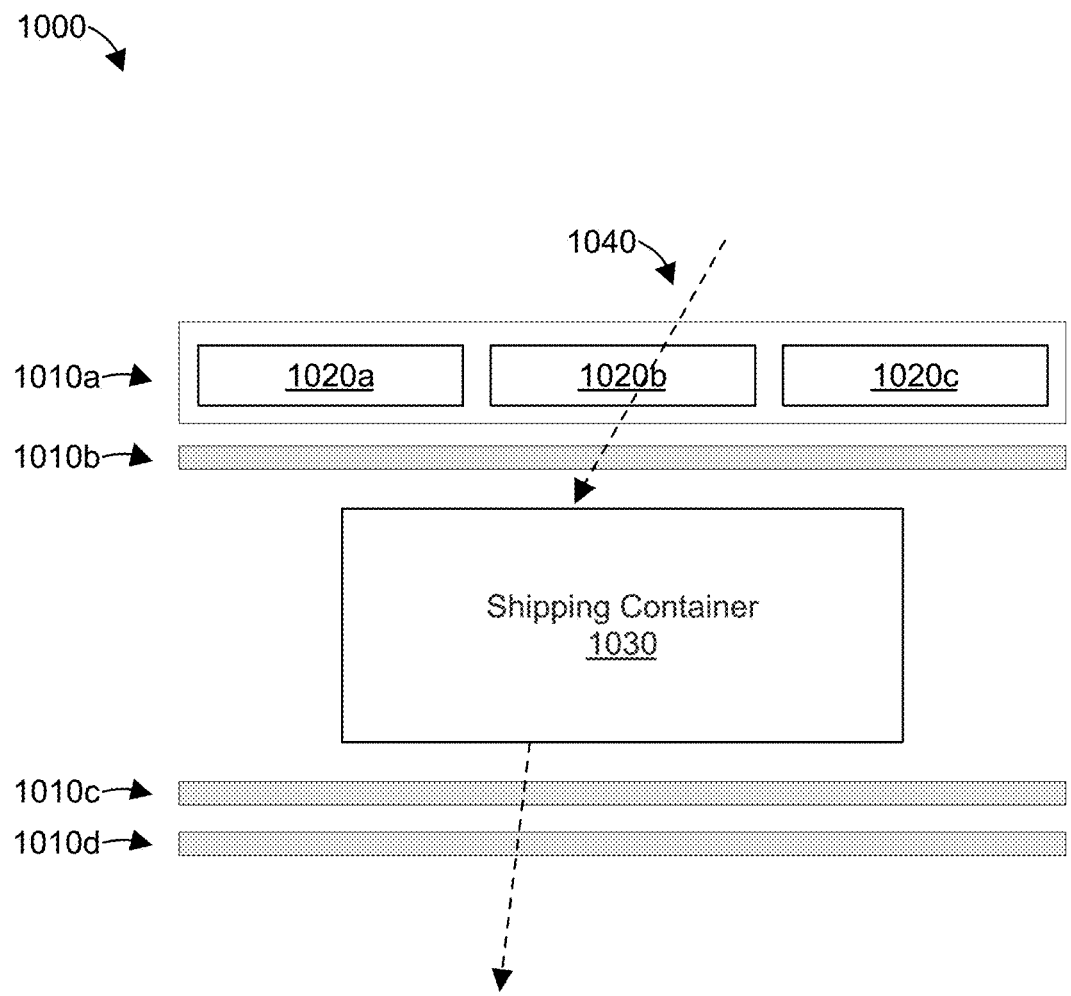
FIG. 10 is a block diagram of a detection system according to an embodiment.

FIG. 10 is a block diagram of a detection system 1000. The detection system 1000 includes a first detection layer 1010a, a second detection layer 1010b, a third detection layer 1010c, and a fourth detection layer 1010d (in general, detection layer 1010). Additional detector layers (not shown in FIG. 10) can be included to improve the tracking above and below the container, and/or as part of a spectrometer that measures the muon's energy. The first detection layer 1010a includes a first detector module 1020a, a second detector module 1020b, and a third detector module 1020c (in general, detector module 1020). Each detector module 1020 includes an array of detectors, for example as described above with respect to FIGS. 8 and 9. Although only illustrated with respect to the first detector layer 1010a, each detector layer 1010 includes a plurality of detector modules 1020. The detector modules 1020 allow the detector layers 1010 to be big enough to scan a large volume such as a shipping container or a truck 1030.

In operation, a muon 1040 (or other charged particle) passes through first and second detector layer 1010a, 1010b. The muon 1040 proceeds to the shipping container 1030 where the muon 1040 is typically deflected based on the cargo in the shipping container. The deflected muon 1040 exits the shipping container 1030 and passes through third and fourth detector layers 1010c, 1010d. Each detector layer 1010 can be measure the x and y coordinates of the muon 1040 in the x-y plane of the respective detector layer 1010. Thus, the x and y coordinates of the first and second detector layers 1010a, 1010b can be used to measure the incoming trajectory of the muon 1040. Similarly, the x and y coordinates of the third and fourth detector layers 1010c, 1010d can be used to measure the outgoing trajectory of muon 1040 after it is deflected by cargo in the shipping container 1030.

In some embodiments, a local coincidence check can be used across detector modules 1020 in a given detector layer 1010. For example, a local FPGA for detector module 1020a can determine whether there was a valid local coincidence in detector module 1020a. If so, the local FPGA can send a signal to the FPGAs for detector modules 1020b, 1020c, which in turn can send signals to retrieve data from their respective FEUs. In addition or in the alternative, the local FPGA for detector module 1020a can send a signal to all FPGAs for detector modules 1020 in each detector layer 1010, which in turn can send signals to retrieve data from their respective FEUs.

In some embodiments, a global coincidence check can be made using detectors in multiple detector layers 1010. For example, a central FPGA can determine whether there was a valid local coincidence in first and second detector layers

1010a, 1010b. If so, the central FPGA can send a global trigger to all FPGAs in each detector layer 1010, which in turn can send signals to retrieve data from their respective FEUs.

Figure 11A:
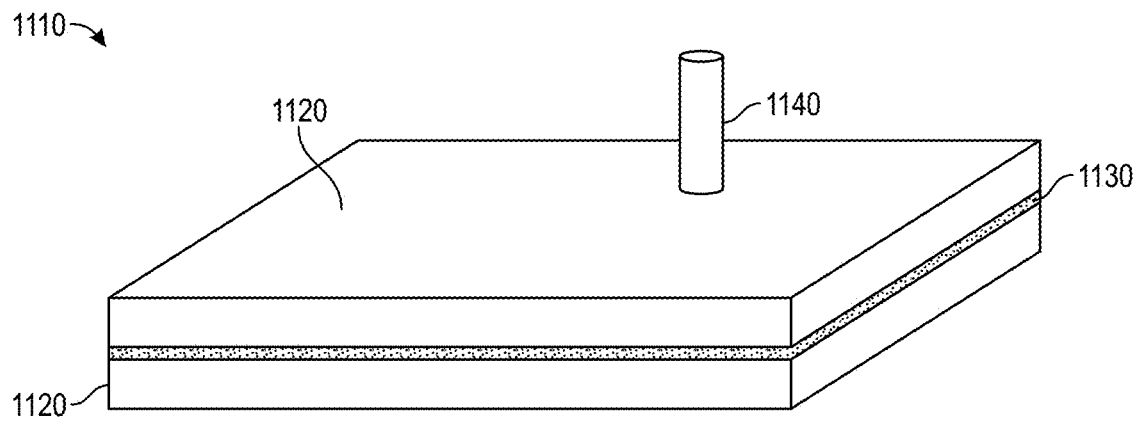
FIGS. 11A and 11B illustrate a perspective view and a side view, respectively, of a detector module according to one or more embodiments.
Figure 11B:
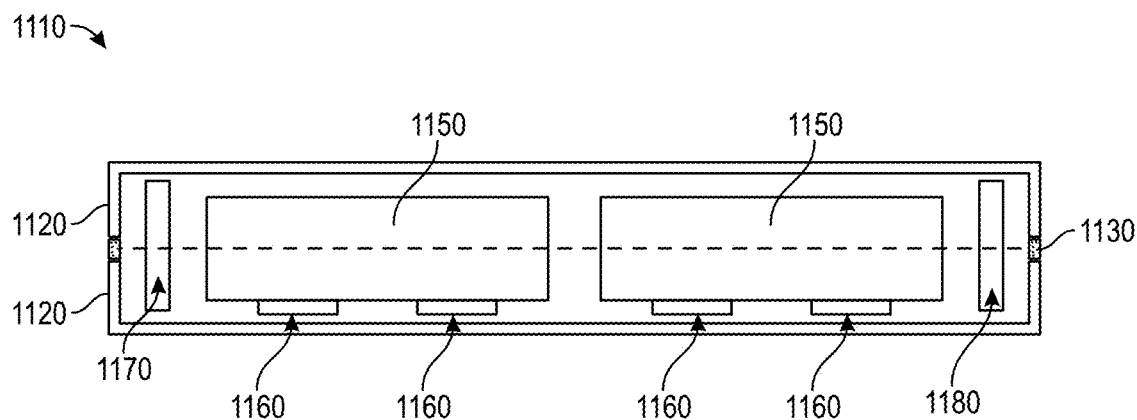

FIGS. 11A and 11B illustrate a perspective view and a side view, respectively, of a detector module 1110 according to one or more embodiments. The detector module 1110 includes a hollow body built to maintain high-purity gas in an internal volume of the hollow body. The hollow body is made of several metallic parts 1120 with vacuum-grade seals 1130 between them. The vacuum-grade seals 1130 can be O-rings that are placed within dedicates grooves, whose design will be apparent to one skilled in the art of vacuum vessel design. The O-rings are preferably made of a material that can maintain most of its sealing force when heated to 100-180° C. For example, the O-rings can be made of VITON™, available from The Chemours Company of Wilmington, Del. USA, or of another fluoroelastomer(s). O-ring materials such as nitrile rubber would not maintain this sealing force.

The hollow body also has a sealable opening 1140 disposed thereon, such as an exit via a pipe that can be cold-welded shut (such as a copper pipe that can be "pinched-off" using a commercially available pinch-off tool, e.g., POD-375 available from CHA Industries, Inc. of Fremont, Calif. USA), or a seal-off valve also known as a pump-out port (e.g. 23028-KEPS available from VAT Group AG of Haag, Switzerland). A simpler, but often more expensive, embodiment of the sealable opening 1140 is a vacuum-grade valve, e.g. a 26428-KA01 HV Valve available from VAT Group AG. The sealable opening 1140 can provide a vacuum-grade seal having a leak rate (e.g., a maximum leak rate) of $1\times10^{-6}$ cc*atm/second or lower, $1\times10^{-7}$ cc*atm/s or lower, $1\times10^{-8}$ cc*atm/s or lower, or other leak rate such as commercially-available valves rated to have a maximum leak rate of $1\times10^{-9}$ cc*atm/s. Within the detector module 1110, low internal pressures should be achievable (e.g., due to the vacuum-grade seals 1130), such as less than or equal to about $1\times10^{-3}$ torr, including about $1\times10^{-4}$ torr, $3\times10^{-5}$ torr, $5\times10^{-5}$ torr, and $1\times10^{-5}$ torr, or any pressure or pressure range between any two of the foregoing pressures.

The hollow body can be used in place of housing 830 in some or all of the embodiments described above. In addition or in the alternative, the hollow body can be the same as housing 830 but with the addition of the sealable opening 1140. The detector module 1110 contains one or more detector assemblies 1150 and FEUs 1160 to read out the detector. The detector module 1110 can also contain additional electronic boards to control the detector and FEUs 1160, and power supplies 1180.

The control boards 1170 can include the FPGA 880 and its support circuits, such as power regulators, power-up circuitry, digital and analog signal line drivers, support for external communication (serial, JTAG, Ethernet, USB, external trigger line) and for internal communications (Inter-integrated circuit bus ($I^2C$), serial peripheral interface (SPI), etc.), on-board memory (DDR3), etc. Such a control box can be contained in electronics boxes 840, 850 and provides some or most of its functionality, notably excluding the functionality of FEUs 1160. The power supplies 1180 supply the cathode 160 and the electrode on the drilled board 140 with the high voltage (HV) needed for electron amplification. The power supplies 1180 can produce the HV using, e.g., boost converters. The power supplies 1180 can be controlled by the control board 1170, e.g., using the $I^2C$ protocol.

In another embodiment, selected components of the detector module such as the FEUs 1160, control boards 1170 and power supplies 1180 may be placed outside the sealed hollow body of detector module 1110.

The metallic parts 1120 can be replaced with similar non-metallic parts made of ceramics or of glass, in which case an additional metallic layer is needed to block external radio-frequency electromagnetic radiation from entering the hollow body and reaching the detector assemblies 1150.

In some embodiments, detector module 1110 can be the same as or different than detector module 1020. For example, each detector assembly 1150 can be the same as or different than detector assembly 10 and/or detector 810. In addition or in the alternative, each FEU 1160 can be the same as or different than FEU 870.

In another embodiment, two or more detection planes are present in the same detector module 1110, that is, in the same gas enclosure. Each detection plane consisting of one or more detector assemblies 1150. This is illustrated in FIGS. 15A-C for a cylindrical gas enclosure. FIG. 15A is a perspective view of a cylindrical gas enclosure that includes two detection planes. FIG. 15B is a top view of a cylindrical gas enclosure that includes three detection planes, each detection oriented at about 120° from the adjacent detection planes. FIG. 15C is a top view of a cylindrical gas enclosure that includes two detection planes that are parallel to each other. The detection planes of FIG. 15A are orthogonal to the detection planes of FIGS. 15B and 15C.

The detector module 1110 can have an internal volume that is greater than or equal to 10 liters. In addition, the total active area of the plurality of modular detector assemblies 1150 can be above 900 $cm^2$.

Figure 12A:
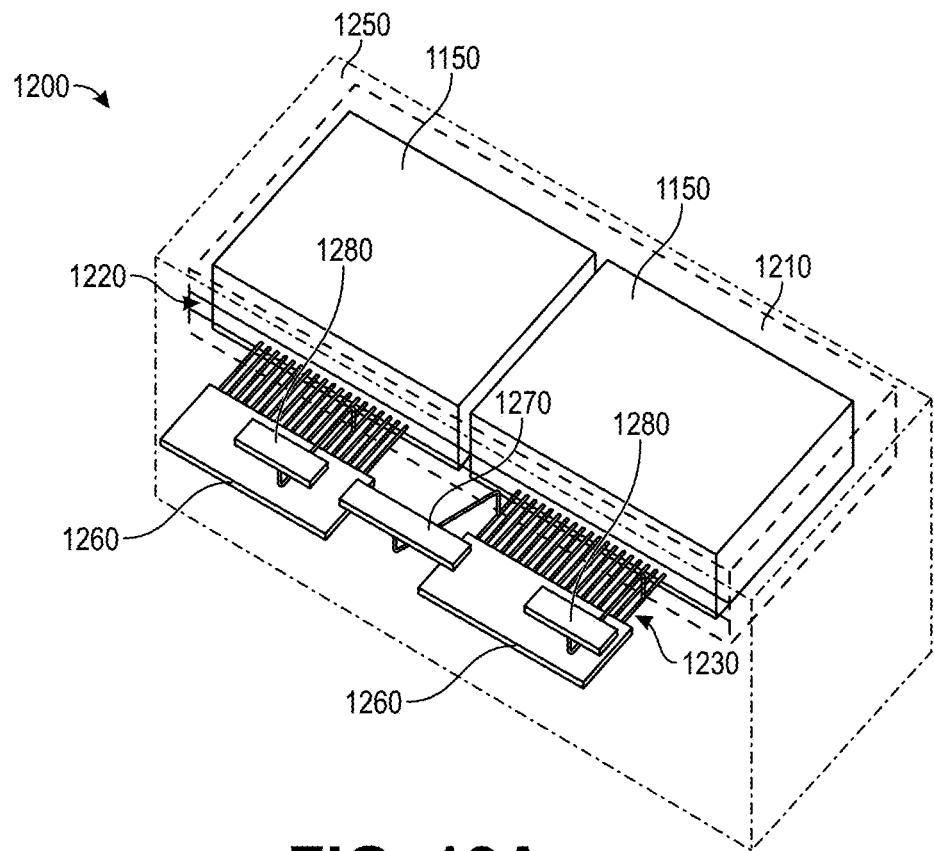
FIGS. 12A and 12B illustrate a perspective view and a side view, respectively, of a detector module according to one or more embodiments.
Figure 12B:
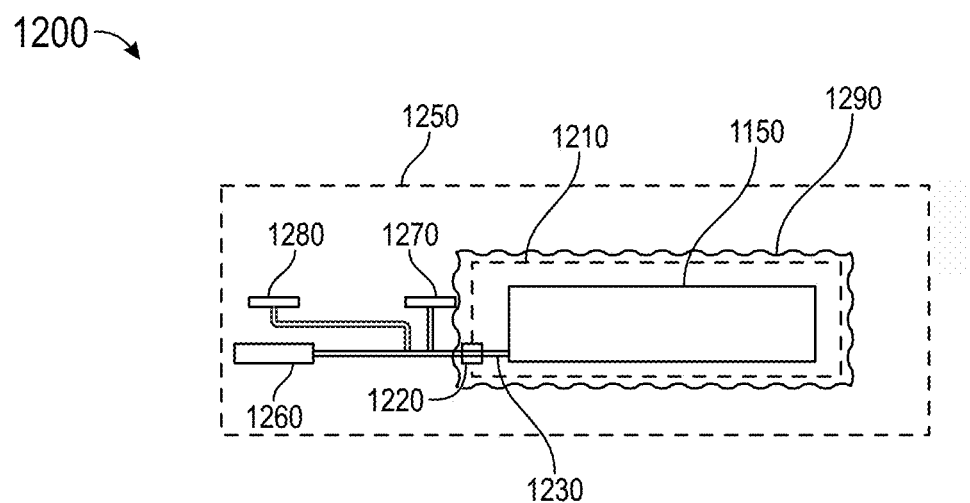

FIGS. 12A and 12B illustrate a perspective view and a side view, respectively, of a detector module 1200 according to one or more embodiments. The detector module 1200 includes a glass hollow body 1210 that can be disposed in an optional external commissioning box 1250 or other external hollow body to protect the glass hollow body 1210 (e.g., from damage or breakage) during transit, during construction of a complete detection system, and/or during placement of the detector module 1200. The external commissioning box 1250 can comprise metal, wood, plastic, or another material. A metallic layer 1290 can be disposed on or around the glass hollow body 1210 to block external radio-frequency electromagnetic radiation from entering the glass hollow body 1210 and reaching the detector assemblies 1150 shielding. The metallic layer 1290 includes an electrically-conductive material such as aluminum (e.g., aluminum foil), tin (e.g., tin foil), a conductive cloth, iron, copper, or other metal. In a specific example, the metallic layer 1290 can include an excellent conductor such as iron that is less than 1 mm in thickness or it can include a poorer conductor such as aluminum that is greater than 1 mm in thickness. In some embodiments, the metallic layer 1290 is the same as or different than the metal lining of housing 830, discussed above.

One or more detector assemblies 1150 are disposed in the glass hollow body 1210, which can include first and second portions that are coupled with a vacuum-grade seal 1220 (e.g., similar to arrangement of metallic parts 1120 in FIG. 11). The vacuum-grade seal 1220 can be made by glass welding without additional sealing parts. This allows for many electrical lines 1230 to exit the sealed volume 1240 since the since the welded seal 1220 conforms around the electrical lines 1230. This allows not only the control boards 1270 and power supplies 1280 to be placed outside the sealed hollow body 1210, but also the FEUs 1260 can be placed outside the hollow body 1210. This is advantageous because more components can be placed outside of the gas volume (e.g., outside of the glass hollow body 1210), which reduces the possible sources of outgassing, and provides easier construction and maintenance for the components located outside the gas volume. The vacuum-grade seal 1220 can provide a seal having a leak rate of $1\times10^{-6}$ cc*atm/second or lower or $1\times10^{-7}$ cc*atm/s or lower, such as $1\times10^{-8}$ cc*atm/s or $1\times10^{-9}$ cc*atm/s. Low internal pressures should be reachable within the detector module 1200, such as less than or equal to about $1\times10^{-3}$ torr, including about $1\times10^{-4}$ tom $3\times10^{-5}$ tom $5\times10^{-5}$ torr, and $1\times10^{-5}$ torr, or any pressure or pressure range between any two of the foregoing pressures. The low internal pressures in detector module 1200 can be reached in the detector module 1200 on its own or when it is disposed in an optional external commissioning box 1250.

The detector module 1200 can include a sealable opening such as sealable opening 1140.

Figure 13:
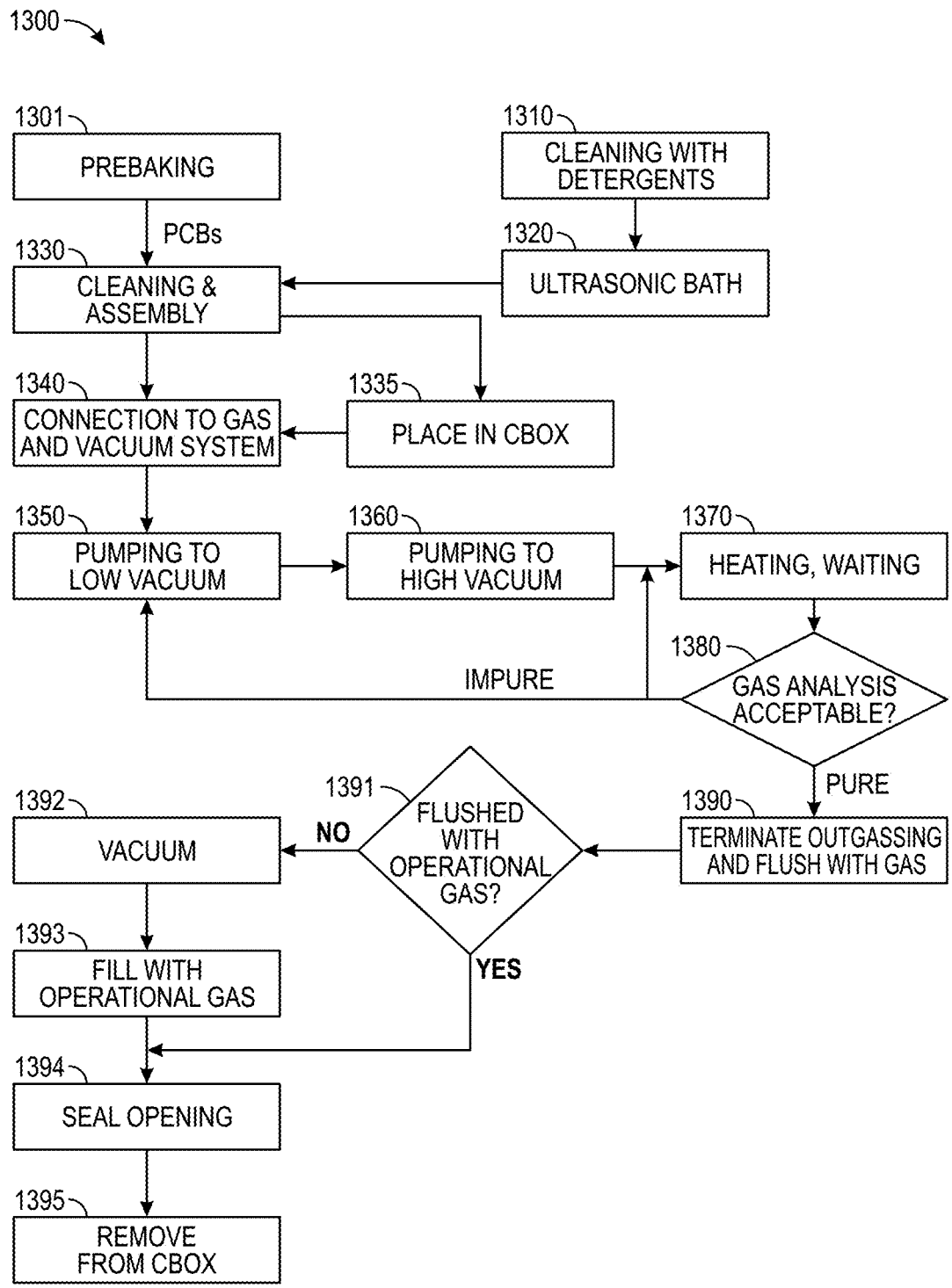
FIG. 13 is a flow chart of a process for preparing a detector module for sealed-mode operation according to an embodiment.

FIG. 13 is a flow chart 1300 of a process for preparing a detector module (e.g., detector module 1110 and/or detector module 1200) for sealed-mode operation. During this process, cheaper gases, such as highly-pure $CO_2$ and/or Ar, can be used instead of the operational gas mixture used when operating the detector. Though the description below refers to detector module 1110, it is also applicable to detector module 1200 or another detector module.

In step 1301, any PCBs or components that include a PCB (e.g., (FEUs 1160, control boards 1170, power supplies 1180 and within detector assemblies 1150) that are disposed in the sealed detector module (e.g., detector module 1110) are pre-baked in an oven for about 1 to about 3 hours at about 120° C. to about 240° C., including about 150° C., about 180° C., about 210° C., or any temperature or temperature range between any two of the foregoing temperatures, to ensure that the epoxy in each PCB is fully cured. The oven can include air or another gas (e.g., an inert gas). In some embodiments, the outgassing of the PCBs can be sampled and measured using a mass spectrometer after the pre-baking, for example to determine if the outgassing of one or more materials is below a threshold value.

In step 1310, the metallic components of the hollow body (e.g., metallic parts 1120 in detector module 1110) are cleaned using one or more grease-removing detergents such as isopropyl alcohol and/or Fisherbrand™ Sparkleen™ 2 Detergent, available from Fisher Scientific Company LLC of Pittsburgh, Pa. USA. The cleaning can be performed manually, automatically, or a combination thereof. For example, the cleaning can be performed, at least in part, by spraying the alcohol and/or detergent from a high-pressure nozzle and/or by placing the metallic components in an ultrasonic path that includes the detergent. The grease-removing detergent(s) can remove oil residues from machining the metallic components and/or fingerprints on the metallic components. In optional step 1320, the metallic components of the hollow body are cleaned in an ultrasonic bath with desalinated water. Similar cleaning procedures, such as applying the detergent(s) during immersion in the ultrasonic bath, will be apparent to one skilled in the art. Steps 1301, 1310, and 1320 can be performed offsite (e.g., away from the factory where the detector modules are constructed).

Additional manual inspection and/or cleaning can be performed as part of the final assembly in step 1330, which can include using a vacuum cleaner. Specifically, the manual inspection and/or cleaning can be to remove any metallic flakes that might have found their way into the detector module and might induce discharges between the drilled board electrode 140 and the resistive plate 130 or between other surfaces with a high voltage differential, rendering the detection module unusable.

Figure 14:
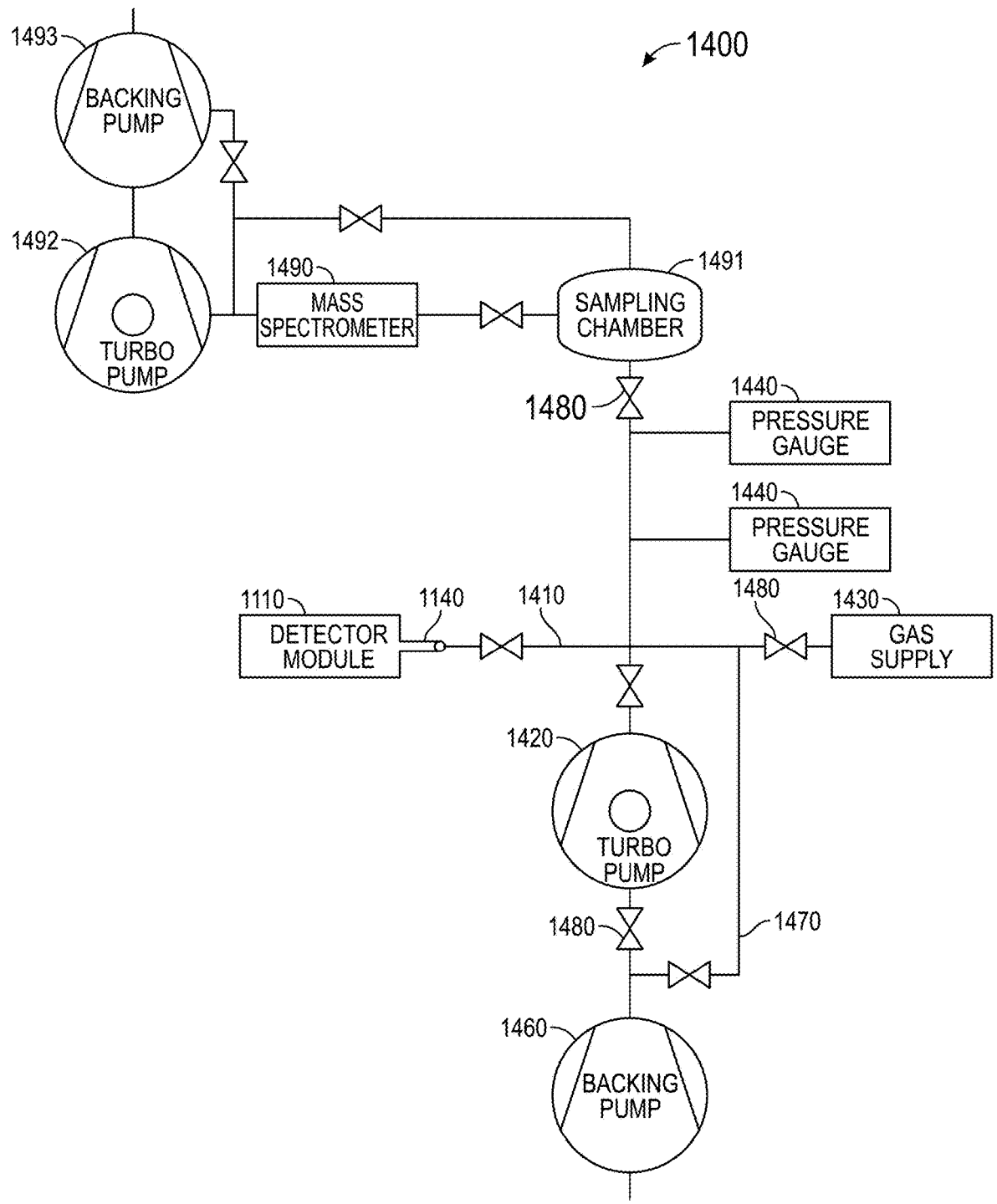
FIG. 14 illustrates the structure of a gas system suitable for the process for preparing a detector module for sealed-mode operation according to an embodiment.

In step 1340, the assembled detection module is then connected to a gas and vacuum system. FIG. 14 illustrates a possible embodiment of a gas and vacuum system 1400. The detector module 1110 is connected through its sealable opening 1140 to a vacuum pipe 1410 which splits to connect to a turbo pump 1420, a gas source 1430, pressure gauges 1440, and gas analyzing sensors 1450. The turbo pump 1420 is also connected to a backing pump 1460, which can also be connected directly to the module via a bypass 1470. Vacuum valves 1480 are situated to allow opening and closing connections as needed by transitioning between states. The pressure gauges 1440 should cover both pressures up to 1 atm, and the vacuum pressures such as $10^{-7}$-$10^{-8}$ atm. Some gas analyzing sensors require that gas flows through them, and so may be placed along the gas lines to the pumps. In the embodiment shown here, mass spectrum analyzer 1490 is connected, with a gas sampling collection chamber 1491 and its own dedicated turbo pump 1492 and backing pump 1493.

The gas source 1430 may be a cylinder of pressurized, premixed gas mixture. The gas source 1430 preferably includes pressure regulators, so that it provides the gas mixture at the desired pressure (e.g., 1.00-1.07 atm), and various safety features such as shutoff valves, mechanical support to prevent the fall of the pressurized gas cylinder, etc. The gas source 1430 is in fluid communication with the detector module 1110, for example via a low-conductance connection.

The vacuum pumps 1420, 1460 are in fluid communication with the detector module 110, for example via one or more high-conductance connections.

In step 1350, the detector module 1110 is pumped down to low vacuum using the backing pump 1460, and then to a higher vacuum, in step 1360, using the turbo pump 1420. During the low vacuum pumping in step 1350, the valve 1480 to the backing pump 1460 is opened while the valves 1480 to the other components (e.g., to turbo pump 1420, to gas supply 1430, to sampling chamber 1491) are closed. During the high vacuum pumping in step 1360, the valve 1480 to the turbo pump 1420 is opened while the valves 1480 to the other components (e.g., to gas supply 1430, to sampling chamber 1491) and valve 1480 to the backing pump 1460 are closed. The pumps 1420, 1460 can reduce the internal pressure of the detector module 1110 to less than or equal to about $1\times10^{-3}$ torr, including about $1\times10^{-4}$ torr, $3\times10^{-5}$ torr, $5\times10^{-5}$ torr 3, and $1\times10^{-5}$ torr, or any pressure or pressure range between any two of the foregoing pressures.

During or after the vacuum pumping in steps 1350 and/or 1360, the detector module 1110 is heated in step 1370. The heating may be performed in an oven, or using heating elements placed near the module without a fixed enclosing structure. In the latter case, more uniform heating can be achieved by placing the heating elements beneath the module and/or by covering the module with a thermal blanket, or some other heat-resistant thermal insulation. The module can be heated to a temperature of about 60° C. to about 200° C., including about 80° C., about 100° C., about 120° C., about 140° C., about 160° C., about 180° C., and any temperature or temperature range between any two of the foregoing temperatures. The temperature for heating can depend on the components/materials used and their heat tolerance (e.g., heating to a higher temperature for components with a higher heat tolerance and heating to a lower temperature for components with a lower heat tolerance). The combination of heat and vacuum accelerates the process of outgassing from the various components of the module.

After waiting a few hours to a few days, the gas in the module is sampled and analyzed in step 1380, for example using the mass spectrometer 1490. If suitably-low levels of selected contaminants are reached (e.g., if the measured concentration level of each contaminant is lower than a respective maximum acceptable contaminant concentration level, such as about 50 parts per million (ppm) for water vapor, about 10 ppm for methanol, vinyl chloride, and any large ion with a mass-to-charge ratio above about 200), the accelerated outgassing is terminated, and the detector module 1110 is cooled down to ambient temperature in step 1390. Otherwise, the accelerated outgassing continues and re-analyzed in step 1380 until suitably-low levels of selected contaminants are reached. The accelerated outgassing can continue for the same or different times in each iteration. For example, the accelerated outgassing in the first iteration (e.g., initially) can proceed for a few days and the accelerated outgassing in the second iteration can proceed for 24 hours, 12 hours to 24 hours, or less than 12 hours.

Once the accelerated outgassing is terminated and the detector module is allowed to cool down in step 1390, detector module 1110 can be flushed with gas to increase its thermal conductivity and facilitate the cooling process. To flush with gas, the valve 1480 to the gas supply 1430 is opened while the other valves 1480 (e.g., to pumps 1420, 1460, to sampling chamber 1491) are closed. If the gas used in the flushing differs from the operational gas mixture, as determined at 1391, it is pumped out in optional vacuum pumping step 1392 (e.g., by opening the valve 1480 to the backing pump 1460 and closing the vales 1480 to the other components) and the detector module 1110 is then filled with its operational gas mixture in step 1393 (e.g., by opening a valve 1480 to an operational gas supply, which can be the same as or different than gas supply 1430, and opening the valve 1480 to the operational gas supply while closing the valves 1480 to the other components) and the sealable opening 1140 is sealed in step 1394. If the gas used in the flushing is the same as the operational gas mixture, as determined at 1391, optional steps 1392 and 1393 are bypassed and the sealable opening 1140 is sealed in step 1394. After the detector module is sealed in step 1394, it is removed from the gas and vacuum system 1400 in step 1395.

If the detector module 1110 is pumped to vacuum while it is under external atmospheric pressure, then it is subject to large mechanical forces due to the pressure difference. The mechanical forces caused by this pressure difference may be far larger than the forces the detector module 1110 will undergo during normal operations, and may require an expensive sturdy construction so that the detector module 1110 does not collapse or distort under pressure. A particularly simple and cost-effective internal construction is to mechanically couple the detector assembly 1150 to the detector walls of metallic parts 1120. However, in this case even a small distortion (for example about 3 mm) of the detector walls can break the required alignment of the layers of the detector assembly. Namely, that the resistive plate 130 is in good electrical contact with the readout board 120 and in close proximity to the drilled board 140.

Such collapse or distortion can be avoided by several means. Some detector geometries, such as a long cylinder, are mechanically advantageous and can withstand such pressure with aluminum walls (e.g., metallic parts 1120) having a thickness of about 2 mm to about 3 mm, or even with thinner steel walls. This is similar to the wall thickness required to shield the detector assemblies 1150 and FEUs 1160 from external radio-frequency electromagnetic noise (e.g., the thickness of the metal lining of housing 830 when the body of housing 830 is an insulator), and detectors with such geometries can easily survive vacuum. For other detector geometries, such as flat detectors designed to cover a large area, mechanical support struts between the top and bottom would produce "dead" areas where detection cannot occur. Further, if the mechanical support struts are electrically-conductive there would need to be large clearances from the struts at the cathode (e.g., cathode 160) and the drilled board (e.g., drilled board 140), which would create even bigger "dead" areas. Two alternatives to mechanical support struts are presented here.

The first alternative is to avoid any pressure differential by performing the outgassing inside a "commissioning box," which is a vacuum oven designed specifically for this task. Unlike generic vacuum ovens, the commissioning box includes means for sealing the sealable opening 1140 while its contents are isolated from the environment. For example, the commissioning box can include a vacuum-grade rotary feedthrough that tightens a valve sealing the sealable opening 1140. This is incorporated in the process for preparing the detector module 1110 for sealed-mode operation as follows: in step 1335 the detector module 1110 is placed inside the commissioning box, described in FIG. 13 as "CBox." In steps 1340-1394 of the process the vacuum pipe 1410 is connected to the commissioning box instead of being connected directly to the detector module 1110. The commissioning box, including the detector module 1110 disposed therein, is then pumped down to vacuum and flushed with gas as a single unit. After the detector module is sealed in step 1394, it is removed from the commissioning box in step 1395.

FIG. 17A illustrates a side view of a possible embodiment of a commissioning box 1700. The detector module 1110 is placed on brackets 1710 that fix its location on the lower part 1720 of the commissioning box 1700. An O-ring 1730 (e.g., a fluoroelastomer O-ring such as a Viton™ O-ring) is located in a suitable groove 1735 around the rim of the lower part 1720, with screw holes 1740 around the O-ring 1730. A pump-out port 1750 (e.g. 23028-KEPS available from VAT Group AG) and its valve mechanism 1760 (e.g. 23028-KA01 available from VAT Group AG) are connected to the sealable opening 1140. A custom mechanical adapter 1770 is attached to the rotating wheel of the valve mechanism 1760.

The upper part 1780 of the commissioning box 1700 includes a rotary feedthrough 1790 (e.g. PF 223 010-T available from Pfeiffer Vacuum GmbH of Asslar, Germany). Another custom mechanical adapter 1775 is connected to the inner shaft of the rotary feedthrough 1790. The brackets 1710 are configured to align the position of the detector module 1110 so that when the upper part 1780 is in place, the mechanical adapter 1775 fits into its slot in the mechanical adapter 1770. The upper part 1780 of the commissioning box 1700 is then placed on top of the lower part 1720 of the commissioning box 1700 and screwed into place using screws 1745. The upper part 1780 also includes an opening 1792 with screw holes 1795 around it. The holes 1795 are positioned for single-claw clamps that will clamp a standard multi-fastener standard DN 100 ISO-MF vacuum flange (e.g. an IS1000400BB multi-fastener flange available from Agilent Technologies, Inc. of Santa Clara, Calif. USA). The valve mechanism 1760 is positioned so that its outlet is roughly aligned with the opening 1792 once the upper part 1780 of the commissioning box 1700 is in place. The valve mechanism 1760 can be the same as or different than the sealable opening 1140 in FIG. 11A. In addition, detector module 1110 can be replaced with detector module 1200.

FIG. 17B illustrates a top view of a possible mechanical interface between the adapter 1770 and the adapter 1775. The flat rectangular body of the adapter 1775 fits loosely within an internal slot 1772 in adapter 1770 providing mechanical tolerance in all three directions while still forcing the adapter 1770 to turn when the adapter 1775 is turned together with the rotary feedthrough 1790.

The second alternative is to use external scaffolding, or other types of mechanical reinforcement, to increase the mechanical robustness of the detector module 1110. However, this requires that the scaffolding is anchored temporarily within the large surfaces of the detector module 1110. For example, the scaffolding can be anchored temporarily with screws. However, typically the thickness of these walls is only 2-3 mm, which does not suffice for a screw thread of sufficient mechanical strength and enough remaining material to control gas diffusion through the wall. Thicker walls will significantly increase the weight of the detector, and thus increase the cost of a complete system that must support many detectors. For example, our basic implementation of a detection system for scanning cargo, as shown in FIG. 10, contains 108 detector modules. Thus, the walls of the detector module must be designed to connect to the scaffolding while avoiding excess weight.

FIGS. 16A and 16B illustrate internal and side views of the mechanical structure of a detector module wall that can be attached to external scaffolding according to an embodiment. Half of the detector module casing 1120 is shown, with screw houses 1620 around each threaded screw hole 1610. For example, each screw house 1620 may extend 3-8 mm inside the rectangular envelope of the gas volume (e.g., inside detector module casing 1120). Also shown are the side walls 1630 of the module casing 1120. The metal parts of the detector module 1110 can be machined using computer numeric control (CNC) so the screw houses 1620, the top and bottom of the module casing 1120 (which can have about 60 cm× about 60 cm surfaces in some embodiments), and the side walls 1630 are all parts of the same block of metal with no seams, and the construction of the screw houses 1620 and holes 1610 costs next to nothing. The screw holes 1610 are placed along the planned external scaffolding 1640 (dashed lines), in the locations planed for the screws 1650. The external scaffolding can comprise aluminum (e.g., aluminum profiles), aluminum alloy(s), steel (e.g., steel beams), steel alloy(s), combinations thereof, or another material. The screw houses 1620 can provide enough thickness for the screws and can provide RF shielding and gas containment but only where the extra thickness is really needed, so that the total weight of the detector is barely increased.

Minute amounts of gas can be sampled from the detector module 1110 and analyzed. Accordingly, the sealable opening 1140 can be implemented as a re-sealable valve rather than as a pinch-off valve. As only minute amounts of gas are sampled, this procedure can be performed on an operational detector without disturbing its operation beyond minor adjustments of the voltages supplied to its electrodes. The levels of various contaminants found in the gas mixture can be used to identify weaknesses in the procedure for preparing the detector module 1110 for sealed-mode operation and particular materials (PCB, electronics, shielding materials, plastics used for electrical insulation, the resistive plate, etc.) or external and internal leaks that should be improved to increase the operating lifetime of a detector module. For example, external leaks will result in contamination whose composition is stable in time, while internal leaks will result in a time-dependent composition as the smaller trapped molecules will reach the main gas volume faster than the larger trapped molecules. The levels of various contaminants can be also be used to predict or estimate when a detector module is expected to fail (e.g., its predicted remaining life), which can be used to determine whether to redeploy the detector module. For example, if the level of contaminants in a detector module indicates that its predicted remaining life is less than a threshold time period (e.g., 1 month or less, 2 months or less, or another time period), the detector module will not be redeployed. However, if the level of contaminants in the detector module indicates that its predicted remaining life is less than the threshold time period, the detector module will be deployed. This method can also be used to sample failed detectors to identify at which concentration each contaminant is likely to disable a detector module.

In one embodiment, the gas and vacuum system 1400 of FIG. 14 can also be used to sample a detector module and analyze it with a gas composition sensor, such as a mass spectrometer, as follows. The valves to the module 1110, turbo pump 1420 and its backing pump 1460, gas supply 1430, and mass spectrometer 1490 are closed, and the pumps 1492 and 1493 are used to bring the sampling chamber 1491 and main gas pipe 1410 to high vacuum. When desired pressure (e.g. $3 \times 10^{-6}$ torr) is achieved, the valves to the pumps 1492 and 1493 are closed, and a tiny, momentary leak (e.g., for a limited time) is allowed through the valve at the sealable opening 1140. A capillary system can be used to reduce the outflow from the module 1110 through the sealable opening 1140 and into the gas pipe 1410 to provide a low-conductance connection therebetween. After this "sip" of gas (e.g., less than or equal to about 10 $cm^3$ of gas), the pressure in the gas pipe and sampling chamber 1491 should be around $10^{-4}$ to $10^{-2}$ torr. At this point the valve from the gas line 1410 to the sampling chamber 1491 is closed, and the pumps 1492 and 1493 are used to reduce the pressure in the sampling chamber 1491 to the level supported by the mass spectrometer 1490 (e.g. $10^{-5}$ torr). The valves from the pumps 1492 and 1493 to the sampling chamber 1491 are closed, and those to the mass spectrometer 1490 are opened and the high vacuum of the mass spectrometer 1490 is restored. At this point the valve to the sampling chamber 1491 is opened and the mass spectrometer 1490 analyzes the gas mixture collected from the detector module 1110. This analysis can provide data for determining the reason(s) the detector module 1110 failed, when the detector module 1110 is expected to fail, and/or to identify at which concentration each contaminant is likely to disable a detector module 1110.

In some embodiments, the analysis can be used to determine gas-related failure modes of a malfunctioning detector module 1110. A detector may be classified as malfunctioning when its trigger rates at fixed voltages have increased by more than a predetermined percentage over a predetermined measurement time period (e.g., several hours or days) such as an increase of at least about 40%, at least about 50%, at least about 60%, or another percentage increase. The predetermined percentage increase can be measured after the detector module 1110 has been in operation for at least 2 hours. Similarly, a detector may be classified as malfunctioning when the maximal voltage differentials it can hold without (a) the average electrical current over a period of 0.001-1 seconds exceeding some threshold, such as 1.2 or 2 microampere excessive, or (b) too many trigger bursts, for example, a trigger burst can be defined as 3 or more triggers with less than 5 microseconds between each pair of subsequent triggers, and having more than 50 trigger bursts per second can be defined as excessive. These failure indicators are also indicative of a gas-related failure, which may be further studied by sampling the gas in the failed module as described in the previous paragraph. The concentrations measured in such malfunctioning detectors for various contaminants, such as water vapor, halogens and oil vapors, indicate which contaminants are linked to the common failure modes of the detectors. This can inform new detector designs and manufacturing and commissioning procedures that will improve the detectors quality.

In some embodiments, the analysis can be used to determine gas-related failure modes of the detector module 1110 by sampling well-functioning detectors without disturbing their operation. The voltage differentials across the cathode and the drilled board can be re-tuned to compensate for the loss of gas due to the sample and/or based on the source of the gas-related failure modes. For example, a detector module can be classified as functioning well when its trigger rates have a trigger rate standard deviation of less than or equal to 20% and the detector module 1110 has been in operation for at least two days. The concentrations measured in such well-functioning detectors for various contaminants, such as water vapor, halogens and oil vapors, indicate the level of contamination tolerated by the particular detector design and manufacturing process. This can inform more economical designs and procedures that will not reduce the detectors quality.

For example, if in a particular detector module design, it is found that chlorine concentrations of up to 50 ppm are tolerable, while in another type of detector modules with similar drilled board 140 the chlorine levels are stable at less than 5 ppm, it may be possible to use simpler and cheaper components for the second design that were ruled out solely because they outgas chlorine. The phrase "similar drill board" should be taken to refer to the board thickness and the hole diameter, as well as to surface finishing, and cleaning procedures applied to the boards before construction of the detector module 1110.

Similarly, if a type of detector has water vapor concentrations well below those found tolerable for the second detector design with similar drilled boards, it may be possible or to use simpler and cheaper seals or a shorter commissioning process for the detectors of the second design.

The present invention should not be considered limited to the particular embodiments described above, but rather should be understood to cover all aspects of the invention as fairly set out in the present claims. Various modifications, equivalent processes, as well as numerous structures to which the present invention may be applicable, will be readily apparent to those skilled in the art to which the present invention is directed upon review of the present disclosure. The claims are intended to cover such modifications.

What is claimed is:

1. A detector module comprising:
   a hollow body having an internal volume that retains a gas;
   a sealable opening disposed on the hollow body, the sealable opening in fluid communication with the internal volume, wherein when the sealable opening is sealed, the sealable opening provides a vacuum-grade seal having a leak rate less than or equal to $1 \times 10^{-6}$ cc*atm/second; and
   a plurality of modular detector assemblies disposed in the hollow body, each modular detector assembly comprising:
   a printed circuit board (PCB) having opposing first and second surfaces, the first surface exposed to an insulating substrate, the second surface including printed circuit lines throughout an active area of each modular detector assembly;
   a resistive plate disposed on and in direct physical contact with the second surface of the PCB;
   a drilled board disposed on the resistive plate; and
   a cathode disposed above the drilled board, the cathode defining a drift volume between the cathode and the drilled board, the drilled board disposed between the drift volume and the resistive plate.

2. The detector module of claim 1, wherein the sealable opening comprises an exit pipe configured to be cold-welded shut.

3. The detector module of claim 1, wherein the sealable opening comprises a seal-off valve.

4. The detector module of claim 1, wherein the sealable opening comprises a vacuum-grade valve.

5. The detector module of claim 1, wherein the hollow body includes:
   first and second metal portions; and
   a vacuum-grade seal disposed between the first and second metal portions.

6. The detector module of claim 1, wherein each modular detector assembly is electrically coupled to a plurality of front-end units (FEUs).

7. The detector module of claim 6, wherein the FEUs are disposed in the hollow body.

8. The detector module of claim 6, wherein:
   the FEUs are disposed outside the hollow body, the FEUs electrically coupled to the modular detector assembly by electrical connectors, and
   the hollow body comprises glass that is welded shut over the electrical connectors.

9. The detector module of claim 8, further comprising an external box, the hollow body disposed in the external box.

10. The detector module of claim 1, wherein the plurality of modular detector assemblies comprises a first modular detector assembly disposed on a first detection plane and a second modular detector assembly disposed on a second detection plane, the first detection plane being different than the second detection plane.

11. The detector module of claim 10, wherein the hollow body is cylindrical.

12. The detector module of claim 1, further comprising an external scaffolding, the external scaffolding mechanically attached to an external surface of the hollow body, wherein the hollow body is adapted to attach to the external scaffolding.

13. The detector module of claim 12, wherein the hollow body is adapted to attach to the external scaffolding using screw houses that locally increase a cross-sectional thickness of the hollow body.

14. The detector module of claim 13, wherein the screw houses are disposed on an inner surface of the hollow body.

15. The detector module of claim 1, wherein the internal volume is greater than or equal to 10 liters and a total active area of the plurality of modular detector assemblies is above 900 cm$^2$.

16. A method of preparing the detector module of claim 1 for sealed-mode operation, the method comprising the following steps:
(a) fluidly coupling at least one vacuum pump to the sealable opening of the detector module;
(b) with the at least one vacuum pump, applying a vacuum pressure to the sealable opening for a predetermined time period to reduce an internal pressure within the detector module to lower than $1\times10^{-3}$ torr; and
(c) while applying the vacuum pressure, heating the detector module with a heat source for the predetermined time period.

17. The method of claim 16, further comprising:
(d) receiving a gas sample from the detector module; and
(e) passing the gas sample through a gas composition sensor to determine a measured gas composition of the gas sample.

18. The method of claim 17, further comprising:
(f) comparing a measured concentration level of a contaminant in the gas sample with a maximum acceptable contaminant concentration level; and
(g) determining that the detector module is ready for the sealed-mode operation when the measured concentration level of the contaminant in the gas sample is lower than the maximum acceptable contaminant concentration level.

19. The method of claim 18, further comprising repeating steps (a)-(g) until the measured concentration level of the contaminant in the gas sample is lower than the maximum acceptable contaminant concentration level.

20. The method of claim 19, wherein steps (a)-(c) initially occur for a first predetermined time period, and steps (a)-(c) are repeated for a second predetermined time period, the second time period shorter than the first predetermined time period.

21. The method of claim 18, further comprising:
flushing the detector module with a chemically-inactive gas mixture prior to step (d); and
after step (g):
stopping the at least one vacuum pump;
cooling the detector module to ambient temperature;
flowing an operational gas mixture into the detector module; and
sealing the sealable opening to retain the operational gas mixture in the hollow body.

22. The method of claim 21, wherein the detector module is flushed with the chemically-inactive gas mixture prior to step (a).

23. The method of claim 21, further comprising flushing the detector module with the operational gas mixture while the detector module is cooling.

24. The method of claim 21, further comprising:
flushing the detector module with a first gas while the detector module is cooling; and
after the cooling, applying a second vacuum pressure, with the at least one vacuum pump, to the sealable opening to remove the first gas from the detector module.

25. The method of claim 21, further comprising:
fluidly coupling the vacuum pump to a commissioning box, the detector module disposed in the commissioning box; and
after sealing the sealable opening, removing the detector module from the commissioning box.

26. The method of claim 16, wherein step (c) further comprises heating the detector module to within a temperature range of about 60° C. to about 200° C.

27. The method of claim 16, further comprising fluidly coupling the at least one vacuum pump to a commissioning box, the detector module disposed in the commissioning box.

28. A method of collecting information on the detector module of claim 1 wherein the sealable opening comprises a re-sealable opening and the detector module comprises an operating detector module, the method comprising:
(a) fluidly coupling at least one vacuum pump and a gas collection volume to the re-sealable opening of the operating detector module;
(b) with the at least one vacuum pump, applying a vacuum pressure to the re-sealable opening;
(c) at least partially opening the re-sealable opening to release a gas sample from the operating detector module to the gas collection volume;
(d) passing the gas sample through a gas composition sensor to determine a measured gas composition of the gas sample; and
(e) analyzing the measured gas composition to determine concentrations of contaminants in the operating detector module,
wherein the method does not compromise further operation of the operating detector module.

29. The method of claim 28, further comprising re-tuning a voltage across the cathode and the drilled board to compensate for the loss of gas in step (c) of claim 28.

30. The method of claim 28, further comprising determining concentration levels of the contaminants that cause the detectors to fail.

31. The method of claim 28, further comprising:
(f) predicting when the operating detector module will fail based on the concentrations of the contaminants; and
(g) redeploying the operating detector only when a predicted remaining life of the operating detector is greater than a threshold time period.

32. An assembly comprising:
a detector module comprising:
a hollow body configured to retain a gas in an internal volume of the hollow body;
a sealable opening disposed on the hollow body, the sealable opening in fluid communication with the internal volume, wherein when the sealable opening is sealed the sealable opening provides a vacuum-grade seal having a leak rate less than or equal to $1\times10^{-6}$ cc*atm/second;
a plurality of modular detector assemblies disposed in the hollow body, each modular detector assembly comprising:
a printed circuit board (PCB) having opposing first and second surfaces, the first surface exposed to an insulating substrate, the second surface including printed circuit lines throughout an active area of each module detector assembly;
a resistive plate disposed on and in direct physical contact with the second surface of the PCB;
a drilled board disposed on the resistive plate; and
a cathode disposed above the drilled board, the cathode defining a drift volume between the cathode and the drilled board, the drilled board disposed between the drift volume and the resistive plate; and
a gas and vacuum system in fluid communication with the sealable opening and comprising:
at least one vacuum pump;
a heat source in thermal communication with the detector module;

a gas source in fluid communication with the sealable opening; and at least one valve disposed between (a) the sealable opening and (b) the vacuum pump and the gas source, the at least one valve having a first state where the vacuum pump is connected to the sealable opening and the gas source is disconnected from the sealable opening, and a second state where the gas source is connected to the sealable opening and the vacuum pump is disconnected from the sealable opening.

33. The assembly of claim 32, wherein the sealable opening comprises an exit pipe configured to be cold-welded shut.

34. The assembly of claim 32, wherein the sealable opening comprises a seal-off valve.

35. The assembly of claim 32, wherein the sealable opening comprises a vacuum-grade valve.

36. The assembly of claim 32, further comprising a gas composition sensor in fluid communication with the sealable opening.

37. The assembly of claim 36, wherein the gas composition sensor comprises a mass spectrometer.

38. The assembly of claim 32, wherein the gas and vacuum system includes a second valve disposed between the sealable opening and a sampling chamber, the second valve having an open state that allows a gas sample from the detector module to pass into the sampling chamber through a low-conductance opening, the second valve having a closed state that blocks the low-conductance opening.

39. The assembly of claim 38, wherein the sampling chamber is fluidly coupled to at least a second vacuum pump and a third valve is disposed between the sampling chamber and the at least a second vacuum pump.

40. The assembly of claim 32, wherein the heat source includes an oven or heating elements, the heating elements disposed beneath the detector module.

41. The assembly of claim 32, further comprising an external scaffolding, the external scaffolding mechanically attached to an external surface of the hollow body, wherein the hollow body is adapted to attach to the external scaffolding.

42. The assembly of claim 41, wherein the hollow body is adapted to attach to the external scaffolding using screw houses that locally increase a cross-sectional thickness of the hollow body.

43. The assembly of claim 42, wherein the screw houses are disposed on an inner surface of the hollow body.

44. The assembly of claim 32, further comprising a commissioning box, the detector module disposed in the commissioning box, and wherein the at least one vacuum pump and the gas source are in fluid communication with the sealable opening via the commissioning box.

45. The assembly of claim 32, wherein the internal volume is greater than or equal to 10 liters and a total active area of the plurality of modular detector assemblies is above 900 $cm^2$.

* * * * *